United States Patent
Kim et al.

(10) Patent No.: US 8,368,826 B2
(45) Date of Patent: Feb. 5, 2013

(54) LIQUID CRYSTAL DISPLAY HAVING BOOSTING CAPACITOR

(75) Inventors: Yoon-Jang Kim, Suwon-si (KR); Kyung-Ho Park, Cheonan-si (KR); Sung-Jae Moon, Seoul (KR); Kee-Bum Park, Cheonan-si (KR)

(73) Assignee: Samsung Display Co., Ltd., Yongin (KR)

( * ) Notice: Subject to any disclaimer, the term of this patent is extended or adjusted under 35 U.S.C. 154(b) by 675 days.

(21) Appl. No.: 12/565,366

(22) Filed: Sep. 23, 2009

(65) Prior Publication Data

US 2010/0157185 A1 Jun. 24, 2010

(30) Foreign Application Priority Data

Dec. 18, 2008 (KR) .................. 10-2008-0129311

(51) Int. Cl.
*G02F 1/1343* (2006.01)
*G02F 1/136* (2006.01)
*G09G 3/36* (2006.01)

(52) U.S. Cl. .............. 349/38; 349/48; 349/144

(58) Field of Classification Search .............. 349/38, 349/39, 48, 144; 345/92
See application file for complete search history.

(56) References Cited

U.S. PATENT DOCUMENTS

| | | | |
|---|---|---|---|
| 7,034,789 B2 | 4/2006 | Takeuchi | |
| 2006/0284811 A1* | 12/2006 | Huang | 345/92 |
| 2008/0024689 A1* | 1/2008 | Ahn | 349/43 |
| 2009/0207330 A1* | 8/2009 | Jung et al. | 349/39 |
| 2009/0268112 A1* | 10/2009 | Lu et al. | 349/38 |

FOREIGN PATENT DOCUMENTS

| | | |
|---|---|---|
| JP | 2004-062146 | 2/2004 |
| KR | 1020070057388 | 6/2007 |
| KR | 1020080047788 | 5/2008 |
| KR | 1020080050704 | 6/2008 |
| KR | 1020080057793 | 6/2008 |
| KR | 1020080058541 | 6/2008 |
| KR | 1020080074606 | 8/2008 |
| KR | 1020080076466 | 8/2008 |

* cited by examiner

*Primary Examiner* — Michael Caley
(74) *Attorney, Agent, or Firm* — H.C. Park & Associates, PLC

(57) ABSTRACT

A liquid crystal display includes: a gate line disposed on a substrate to transmit a first gate signal to switching elements; a data line crossing the gate line to transmit a data voltage to the switching elements; a boosting gate line disposed on the substrate to transmit a second gate signal; a pixel electrode disposed on the substrate and including a first subpixel electrode and a second subpixel electrode; a first switching element connected to the first subpixel electrode; a second switching element connected to the second subpixel electrode; a boosting capacitor including a first terminal connected to the first subpixel electrode; a third switching element connected to a second terminal of the boosting capacitor; and a fourth switching element including a gate electrode connected to the boosting gate line, a source electrode connected to the second subpixel electrode, and a drain electrode connected to the second terminal.

27 Claims, 23 Drawing Sheets

LIQUID CRYSTAL DISPLAY HAVING BOOSTING CAPACITOR

CROSS REFERENCE TO RELATED APPLICATION

This application claims priority from and the benefit of Korean Patent Application No. 10-2008-0129311, filed on Dec. 18, 2008, which is hereby incorporated by reference for all purposes as if fully set forth herein.

BACKGROUND OF THE INVENTION

1. Field of the Invention

The present invention relates to a liquid crystal display.

2. Discussion of the Background

A liquid crystal display (LCD) is one type of widely used flat panel displays (FPDs). The LCD is composed of two display panels on which field generating electrodes such as pixel electrodes and a common electrode are formed, and a liquid crystal layer is disposed between the two display panels. A voltage is applied to the field generating electrodes to generate an electric field in the liquid crystal layer, which determines an orientation of liquid crystal molecules of the liquid crystal layer that controls a polarization of incident light passing through the liquid crystal layer to display an image.

A vertical alignment (VA) mode LCD has the liquid crystal (LC) molecules aligned with their long axes perpendicular to the display panels in the absence of the electric field. The VA mode LCD is of interest because of its high contrast ratio and wide reference viewing angle.

In the VA mode LCD a plurality of domains in which the alignment direction of the liquid crystal molecules within respective domains are different from the alignment direction of the liquid crystal molecules in the other domains may be formed in one pixel to achieve the wide reference viewing angle.

Methods in which a minute slit or a cutout is formed in the field generating electrodes or a protrusion have been proposed as means for forming the plurality of domains in one pixel. In this method, the plurality of domains may be formed by aligning the liquid crystal molecules vertically with respect to a fringe field generated between the edges of the cutout or the protrusion and the field generating electrodes facing the edges.

Also, a light alignment method in which light is irradiated to an alignment layer to control an alignment angle and alignment direction of the liquid crystal molecules has been proposed as another way to form the plurality of domains in one pixel.

On the other hand, the liquid crystal display of the VA mode may have lower side visibility compared with front visibility. Thus, one pixel may be divided into two subpixels, and different voltages may be applied to the subpixels to solve this problem.

Among the various methods for applying a different voltage to each subpixel, one method applies one data voltage to two subpixels, and then a charged voltage of one subpixel is pulled down and a charged voltage of the other subpixel is raised up through a boosting capacitor such that the visibility may be improved by differentiating the voltages of the two subpixels without a reduction of the aperture ratio due to increasing the number of data lines or gate lines. Also, a decrease of luminance due to capacitive coupling of two subpixels may be eliminated.

SUMMARY OF THE INVENTION

Exemplary embodiments of the present invention provide a liquid crystal display having a difference in charging voltage between subpixels to improve the viewing angle and the transmittance.

Additional aspects and/or advantages of the invention will be set forth in part in the description which follows and, in part, will be obvious from the description, or may be learned by practice of the invention.

An exemplary embodiment of the present invention discloses a liquid crystal display comprising: a first substrate; a gate line disposed on the first substrate and transmitting a first gate signal; a data line crossing the gate line and transmitting a data voltage; a boosting gate line disposed on the first substrate and transmitting a second gate signal; a pixel electrode disposed on the first substrate and comprising a first subpixel electrode and a second subpixel electrode; a first switching element comprising a first gate electrode connected to the gate line, a first source electrode connected to the data line, and a first drain electrode connected to the first subpixel electrode; a second switching element comprising a second gate electrode connected to the gate line, a second source electrode connected to the data line, and a second drain electrode connected to the second subpixel electrode; a boosting capacitor comprising a first terminal connected to the first subpixel electrode; a third switching element comprising a third gate electrode connected to the gate line, a third source electrode, and a third drain electrode connected to a second terminal of the boosting capacitor; and a fourth switching element comprising a fourth gate electrode connected to the boosting gate line, a fourth source electrode connected to the second subpixel electrode, and a fourth drain electrode connected to the second terminal.

An exemplary embodiment of the invention also discloses a liquid crystal display comprising: a gate line transmitting a first gate signal; a boosting gate line transmitting a second gate signal; a first data line transmitting a first data voltage and a second data line transmitting a second data voltage; and a first pixel and a second pixel that are disposed between the first data line and the second data line, the first pixel and the second pixel neighboring each other. Each of the first pixel and the second pixel comprises: a first subpixel comprising a first liquid crystal capacitor and a first switching element; a second subpixel comprising a second liquid crystal capacitor and a second switching element; and a boosting unit comprising a third switching element controlled by the first gate signal, a fourth switching element connected to the third switching element and controlled by the second gate signal, and a boosting capacitor connected between the third switching element and the first liquid crystal capacitor. The first switching element and the second switching element of the first pixel respectively transmit the first data voltage to the first liquid crystal capacitor and the second liquid crystal capacitor of the first pixel in response to the first gate signal, and the first switching element and the second switching element of the second pixel respectively transmit the second data voltage to the first liquid crystal capacitor and the second liquid crystal capacitor of the second pixel in response to the first gate signal.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
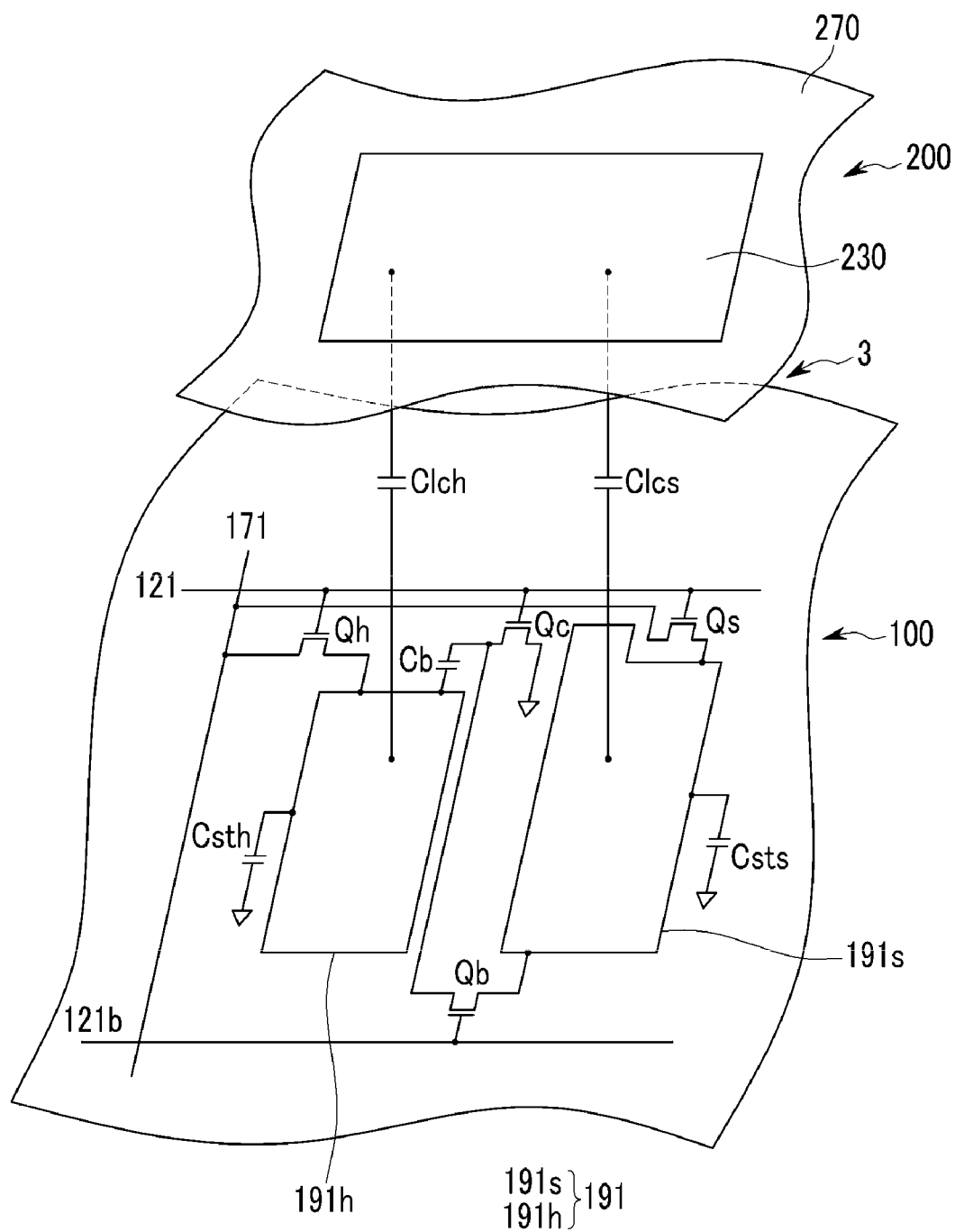
FIG. 1 is an equivalent circuit diagram of two subpixels in a liquid crystal display according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

Reference to "embodiment" or "an embodiment" means that a particular feature, structure, or characteristic described in connection with the embodiment is included in at least one embodiment of the invention. The appearances of the phrase "an embodiment" in various places in the specification are not necessarily all referring to the same embodiment, nor are separate or alternative embodiments mutually exclusive of other embodiments. Moreover, various features are described which may be exhibited by some embodiments and not by others. Detailed descriptions of well-known functions and structures incorporated herein may be omitted to avoid obscuring the subject matter of the present invention.

In the drawings, the thickness of layers, films, panels, regions, etc., may be exaggerated for clarity. It will be understood that when an element such as a layer, film, region, or substrate is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present.

Now, a liquid crystal display according to an exemplary embodiment of the present invention will be described with reference to FIG. 1 and FIG. 2.

Figure 2:
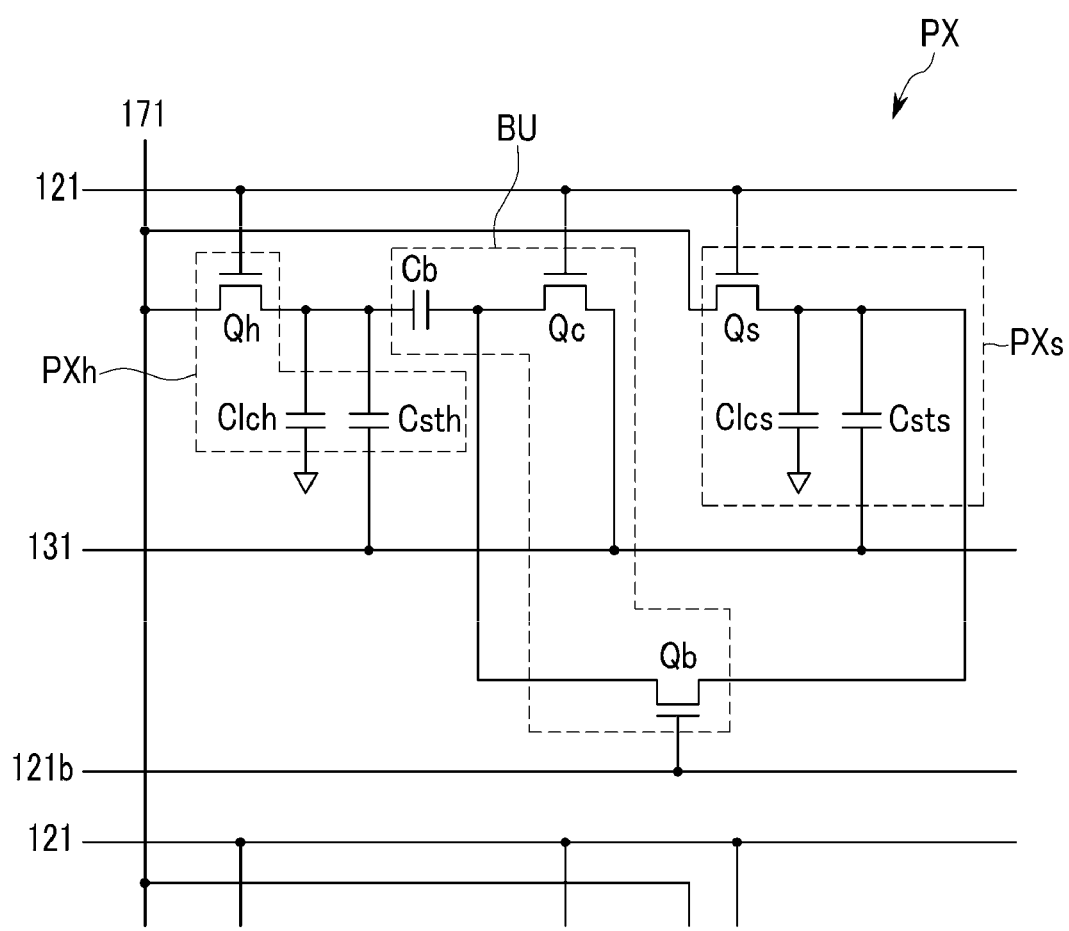
FIG. 2 is an equivalent circuit diagram of one pixel in a liquid crystal display according to an exemplary embodiment of the present invention.

FIG. 1 is an equivalent circuit diagram of two subpixels in a liquid crystal display according to an exemplary embodiment of the present invention, and FIG. 2 is an equivalent circuit diagram of one pixel in a liquid crystal display according to an exemplary embodiment of the present invention.

Referring to FIG. 1 and FIG. 2, a liquid crystal display according to the present exemplary embodiment includes signal lines including a plurality of gate lines 121, a plurality of boosting gate lines 121b, a plurality of data lines 171, and a plurality of common voltage lines 131, and a plurality of pixels PX connected thereto. From the point of view of a structure, the liquid crystal display includes a lower panel 100 and an upper panel 200 spaced apart and facing each other, and a liquid crystal layer 3 interposed therebetween.

The signal lines 121, 121b, 131, and 171 are all disposed on the lower panel 100. The gate lines 121 and the boosting gate lines 121b transmit gate signals, the data lines 171 transmit data signals, and the common voltage lines 131 are applied with a predetermined voltage such as a common voltage Vcom.

Referring to FIG. 2, each pixel PX includes a first subpixel PXh and a second subpixel PXs, and a boosting unit BU. The first subpixel PXh includes a first switching element Qh, a first liquid crystal capacitor Clch, and a first storage capacitor Csth, and the second subpixel PXs includes a second switching element Qs, a second liquid crystal capacitor Clcs, and a second storage capacitor Csts, and the boosting unit BU includes a third switching element Qc, a fourth switching element Qb, and a boosting capacitor Cb.

The first switching element Qh, the second switching element Qs, the third switching element Qc and the fourth switching element Qb are three-terminal elements such as a thin film transistor, etc., which are provided on the lower panel 100.

The control terminals of the first switching element Qh and the second switching element Qs are respectively connected to the gate line 121 and the input terminals thereof are respectively connected to the data line 171. The output terminal of the first switching element Qh is connected to the first liquid crystal capacitor Clch and the first storage capacitor Csth, and the output terminal of the second switching element Qs is connected to the second liquid crystal capacitor Clcs and the second storage capacitor Csts.

The control terminal of the third switching element Qc is connected to the gate line 121, the input terminal thereof is connected to the common voltage line 131, and the output terminal thereof is connected to the fourth switching element Qb and the boosting capacitor Cb.

The control terminal of the fourth switching element Qb is connected to the boosting gate line 121b. The input terminal of the fourth switching element Qb is connected to the output terminal of the second switching element Qs, the second liquid crystal capacitor Clcs, and the second storage capacitor Csts. The output terminal of the fourth switching element Qb is connected to the output terminal of the third switching element Qc and the boosting capacitor Cb.

Referring to FIG. 1, the first liquid crystal capacitor Clch includes a first subpixel electrode 191h of the lower panel 100 and a common electrode 270 of the upper panel 200 as two terminals. The second liquid crystal capacitor Clcs includes a second subpixel electrode 191s of the lower panel 100 and the common electrode 270 of the upper panel 200 as two terminals. The liquid crystal layer 3 between the two terminals serves as a dielectric material. The first subpixel electrode 191h and the second subpixel electrode 191s are separated from each other and form one pixel electrode 191. The common electrode 270 is formed on the whole surface of the upper panel 200 and is applied with the common voltage Vcom. The liquid crystal layer 3 has negative dielectric anisotropy, and liquid crystal molecules of the liquid crystal layer 3 may be aligned such that their major axes are perpendicular to the surfaces of the two display panels when an electric field is not applied. In another exemplary embodiment, the common electrode 270 may be formed on the lower panel 100, and at least one of the two electrodes 191 and 270 may have a linear shape or a bar shape (not shown).

The first storage capacitor Csth, which serves as an auxiliary to the first liquid crystal capacitor Clch, includes the first subpixel electrode 191h and the common voltage line 131 overlapping each other with an insulator interposed therebetween, and the second storage capacitor Csts, which serves as an auxiliary to the second liquid crystal capacitor Clcs, includes the second subpixel electrode 191s and the common voltage line 131 overlapping each other with an insulator interposed therebetween. However, in an optional embodiment the first storage capacitor Csth and the second storage capacitor Csts may be formed by the respective first and second subpixel electrodes 191h and 191s and the overlying previous gate line 121 arranged to overlap and spaced apart from the first and second subpixel electrodes 191h and 191s by the insulator. Also optionally, the storage capacitors Csth and Csts may be omitted.

The boosting capacitor Cb is formed by the first subpixel electrode 191h of the lower panel 100 as one terminal, and the output terminals of the third switching element Qc and the fourth switching element Qb as the other terminal, to overlap each other through the insulator interposed therebetween.

Meanwhile, for color display, each pixel PX uniquely displays one of three primary colors (spatial division) or each pixel PX alternately displays the three primary colors (temporal division) as time passes, and a desired color is recognized by a spatial or temporal sum of the primary colors. For example, the primary colors are three primary colors of red, green, and blue. FIG. 1 shows a color filter 230 displaying one of the primary colors on a region of the upper panel 200 by each of the pixels as an example of spatial division. Optionally, the color filter 230 may be provided on or under the subpixel electrodes 191h and 191s of the lower panel 100 (not shown).

An operation of the liquid crystal display according to an exemplary embodiment of the present invention will now be described with reference to FIG. 1 and FIG. 2.

First, an example in which the data voltage applied to the data line 171 has a positive polarity with reference to the common voltage Vcom will be described.

When the gate-on voltage is applied to the gate line 121, the first switching element Qh, the second switching element Qs and the third switching element Qc (e.g., thin film transistors) connected thereto are turned on.

Accordingly, the data voltages applied to the data line 171 are transmitted to the first sub-pixel electrode 191h and the second sub-pixel electrode 191s through the first thin film transistor Qh and the second thin film transistor Qs that are turned on. Therefore, the voltages of the first and second subpixel electrodes 191h and 191s are equal to each other. The first liquid crystal capacitor Clch is charged with a voltage corresponding to a difference between the common voltage of the common electrode 270 and the voltage of the first subpixel electrode 191h, and the second liquid crystal capacitor Clcs is charged with a voltage corresponding to a difference between the common voltage of the common electrode 270 and the voltage of the second subpixel electrode 191s, such that the voltage charged in the first liquid crystal capacitor Clch and the voltage charged in the second liquid crystal capacitor Clcs are the same. Also, positive charges are gathered to the first and second subpixel electrodes 191h and 191s.

On the other hand, when the common voltage Vcom of the common voltage line 131 is applied to the second terminal of the boosting capacitor Cb through the third thin film transistor Qc, the voltage of the first subpixel electrode 191h is applied to the first terminal of the boosting capacitor Cb. Thus, the boosting capacitor Cb is charged with a voltage corresponding to a difference between the voltage of the first subpixel electrode 191h and the common voltage Vcom, and negative charges are gathered to the junction point of the third thin film transistor Qc and the boosting capacitor Cb, that is, the second terminal of the boosting capacitor Cb.

Then, when the gate line 121 is applied with a gate-off voltage and the boosting gate line 121b is applied with a gate-on voltage, the first thin film transistor Qh, the second thin film transistor Qs, and the third thin film transistor Qc that are connected to the gate line 121 are turned off, and the fourth thin film transistor Qb connected to the boosting gate line 121b is turned on.

According to the turning off of the first thin film transistor Qh, the second thin film transistor Qs, and the third thin film transistor Qc, the first and second subpixel electrodes 191h and 191s and the second terminal of the boosting capacitor Cb are floated. The second subpixel electrode 191s and the second terminal of the boosting capacitor Cb are connected to each other according to the turning on of the fourth thin film transistor Qb. Thus, the positive charges gathered to the second subpixel electrode 191s and the negative charges gathered to the second terminal of the boosting capacitor Cb are mixed with each other. Accordingly, the voltage of the second subpixel electrode 191s is decreased and the voltage of the second terminal of the boosting capacitor Cb is increased. When the voltage of the second terminal of the boosting capacitor Cb is increased, the voltage of the first subpixel electrode 191h that is floated is also increased. Accordingly, the voltage difference between two terminals of the first liquid crystal capacitor Clch is increased. Meanwhile, the voltage of the second subpixel electrode 191s is decreased such that the voltage between two terminals of the second liquid crystal capacitor Clcs is also decreased.

In an embodiment in which the area of the second subpixel electrode 191s is larger than the area of the first subpixel electrode 191h, the capacitance of the second liquid crystal capacitor Clcs is larger than the capacitance of the first liquid crystal capacitor Clch such that the voltage drop amount of the second subpixel electrode 191s is larger than the voltage rising amount of the first subpixel electrode 191h.

In contrast, in an embodiment in which the data voltage applied to the data line 171 has a negative polarity with reference to the common voltage Vcom, the charges gathered to the two respective terminals of each of the capacitors Clch, Clcs, Csth, Csts, and Cb have the opposite polarity to the above-described embodiment. When the boosting gate line 121b is applied with the gate-on voltage such that the fourth thin film transistor Qb is turned on, the voltage of the second subpixel electrode 191s which is negative is increased so that its difference from the common voltage Vcom is decreased, and the charged voltage of the second liquid crystal capacitor Clcs is decreased. At the same time, the voltage of the second terminal of the boosting capacitor Cb is decreased such that the voltage of the first subpixel electrode 191h is also decreased, and thereby the difference between the voltage of the first subpixel electrode 191h and the common voltage Vcom is further increased. Accordingly, the charged voltage of the first liquid crystal capacitor Clch is increased.

According to the present exemplary embodiment, the charged voltage of the first liquid crystal capacitor Clch may always be greater than the charged voltage of the second liquid crystal capacitor Clcs regardless of the polarity of the data voltage.

Therefore, the charged voltages of the first and second liquid crystal capacitors Clch and Clcs are changed to be different from each other without a reduction of the total luminance and transmittance such that the luminance of the two subpixels PXh and PXs may be different from each other. If the voltages of the first and second liquid crystal capacitors Clch and Clcs are appropriately controlled, the image shown at the side (large viewing angle) may be approximately the same as the image shown at the front of the display panel. That is to say, the gamma curve of the side may be approximately the gamma curve of the front, thereby improving the side visibility and increasing the transmittance.

Also, whenever the boosting gate line 121b is applied with the gate-on voltage, the voltage of the second terminal of the boosting capacitor Cb is refreshed to the common voltage Vcom by the third thin film transistor Qc such that an afterimage of the previous frame may be removed.

Also, the gate signal for controlling the fourth switching element Qb is applied through the boosting gate line 121b that is driven separately from the gate line 121 such that it may be possible to pre-charge the liquid crystal capacitors Clch and Clcs of the following pixel TOW.

Next, the arrangement of the signal lines and the pixels of the liquid crystal display will be described with reference to FIG. 3 and FIG. 4 as well as FIG. 1 and FIG. 2.

Figure 3:
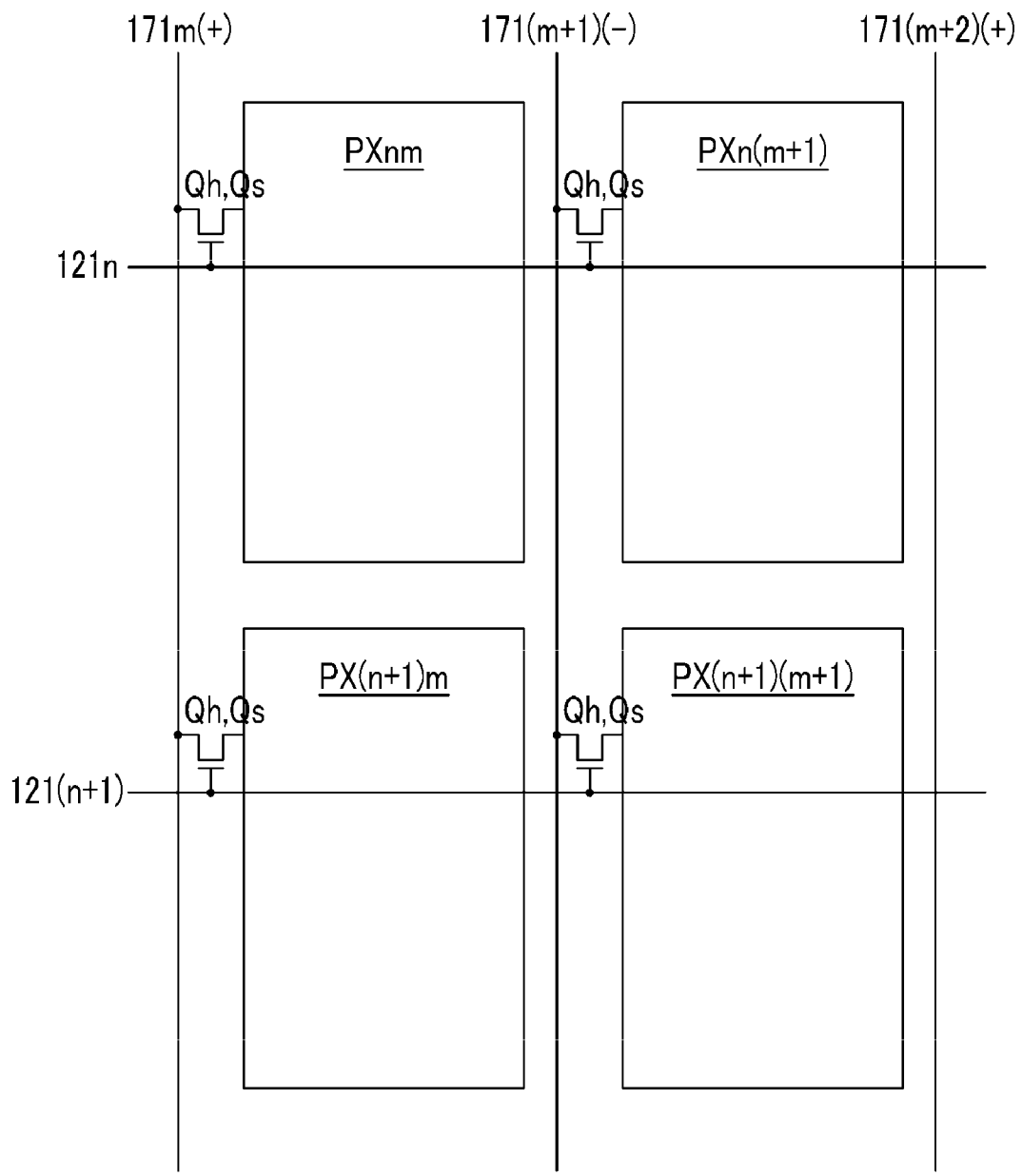
FIG. 3 and FIG. 4 are layout views showing a signal line, a thin film transistor, and a pixel electrode in a liquid crystal display according to an exemplary embodiment of the present invention.
Figure 4:
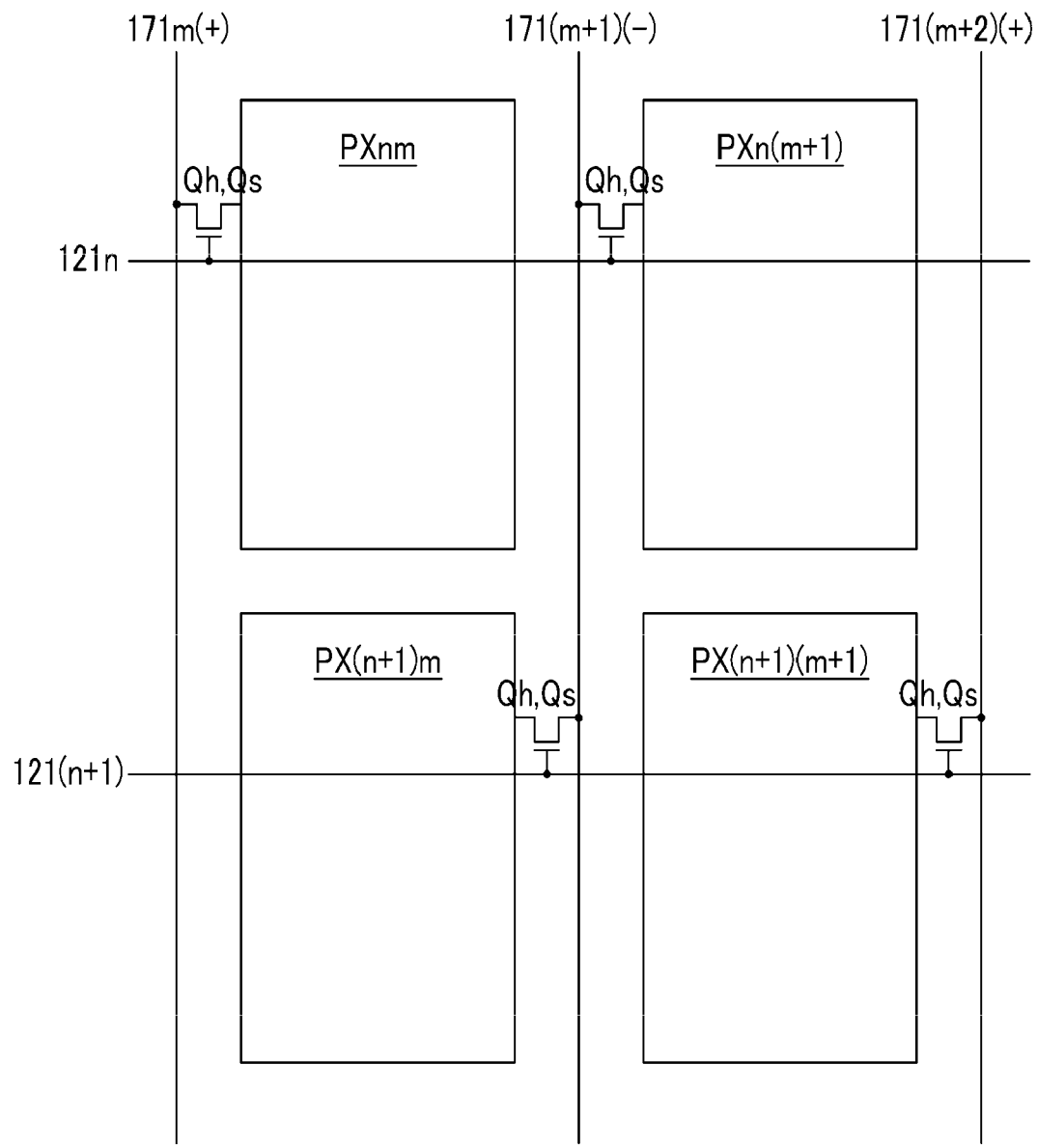

FIG. 3 and FIG. 4 are layout views showing a signal line, a thin film transistor, and a pixel electrode in a liquid crystal display according to an exemplary embodiment of the present invention.

Referring to FIG. 3 and FIG. 4, a liquid crystal display according to the present exemplary embodiment includes signal lines having a plurality of gate lines 121n and 121(n+1), a plurality of boosting gate lines (not shown), a plurality of data lines 171m, 171(m+1), and 171(m+2), and a plurality of pixels PXnm, PXn(m+1), PX(n+1)m, and PX(n+1)(m+1). The array of pixels PXnm, PXn(m+1), PX(n+1)m, and PX(n+1)(m+1) according to this embodiment may be disposed in a matrix shape.

In the illustrated embodiment of FIG. 3, all pixels PXnm, PXn(m+1), PX(n+1)m, PX(n+1)(m+1) are connected to the left data lines 171m and 171(m+1) through the switching elements Qh and Qs. Accordingly, when the data voltages having the opposite polarity are applied to the neighboring data lines 171m, 171(m+1), and 171(m+2), a column inversion driving method is exemplified.

In the illustrated embodiment of FIG. 4, the switching elements Qh and Qs of the pixels PXnm, PXn(m+1), PX(n+1)m, and PX(n+1)(m+1) that are neighboring in the row direction are connected to the data lines 171m, 171(m+1), and 171(m+2) in the same direction. However the switching elements Qh and Qs of the pixels PXnm, PXn(m+1), PX(n+1)m, and PX(n+1)(m+1) that are neighboring in the column direction are connected to the data lines 171m, 171(m+1), and 171(m+2) in opposite directions to each other. That is, the switching elements Qh and Qs connected to the left data lines 171m, 171(m+1), and 171(m+2), and the switching elements Qh and Qs connected to the right data lines 171m, 171(m+1), and 171(m+2) are alternately arranged in the column direction. Accordingly, when the data voltages having the opposite polarity are applied to the neighboring data lines 171m, 171(m+1), and 171(m+2), the pixel array may be dot inversion driven.

The pixels PXnm, PXn(m+1), PX(n+1)m, and PX(n+1)(m+1) including the switching elements Qh and Qs, and the operations thereof are described above with reference to the illustrated embodiments shown in FIG. 1 and FIG. 2 such that further details are omitted here.

Next, one exemplary embodiment of the driving method for the liquid crystal display shown in FIG. 1, FIG. 2, FIG. 3 and FIG. 4 will be described with reference to FIG. 5.

Figure 5:
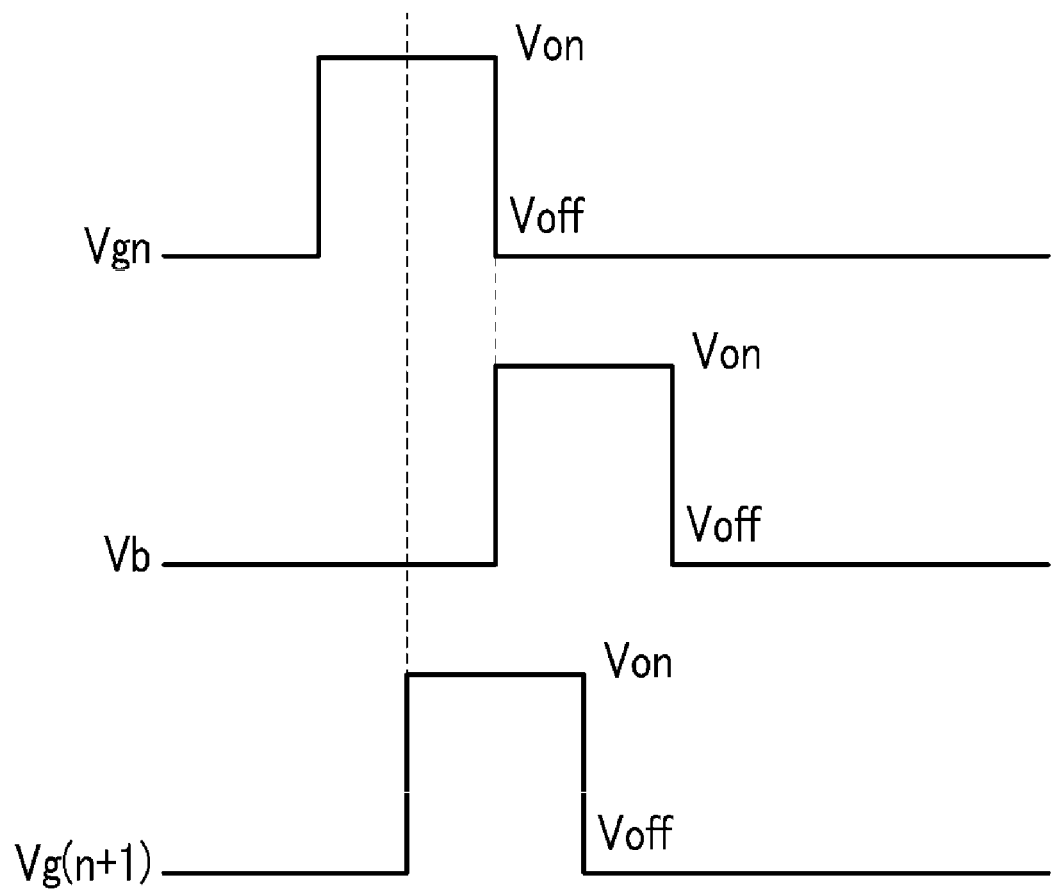
FIG. 5 is a waveform diagram showing a gate signal of a liquid crystal display according to an exemplary embodiment of the present invention.

FIG. 5 is a waveform diagram of a gate signal of a liquid crystal display according to an exemplary embodiment.

Referring to FIG. 3, FIG. 4, and FIG. 5, the gate signal Vgn is a signal that is applied to the n-th gate line 121n, the gate signal Vb is a signal that is applied to the boosting gate line 121b, referring to FIG. 1 and FIG. 2, connected to the pixels PXnm and PXn(m+1) that are connected to the n-th gate line 121n, and the gate signal Vg(n+1) is a signal that is applied to the (n+1)-th gate line 121(n+1).

As described above, if the gate line 121n is applied with the gate-on voltage Von, the first and second subpixel electrodes 191h and 191s are applied with the data voltage through the first and second switching elements Qh and Qs. Next, the gate line 121n is applied with the gate-off voltage Voff and simultaneously the boosting gate line 121b is applied with the gate-on voltage Von such that the voltages of the first and second subpixel electrodes 191h and 191s become different from each other. Here, the time that the gate line 121(n+1) is applied with the gate-on voltage Von and the time that the previous gate line 121n is applied with the gate-on voltage Von may overlap each other.

Accordingly, because the application times of the gate-on voltage Von for the neighboring gate lines 121n and 121(n+1) overlap each other, the liquid crystal capacitors Clch and Clcs may be previously charged under a high speed driving of the liquid crystal display, for example, at more than 120 Hz, thereby obtaining a sufficient driving margin.

Next, the detailed structure of the liquid crystal display according to an exemplary embodiment of the present invention will be described with reference to FIG. 6 and FIG. 7.

Figure 6:
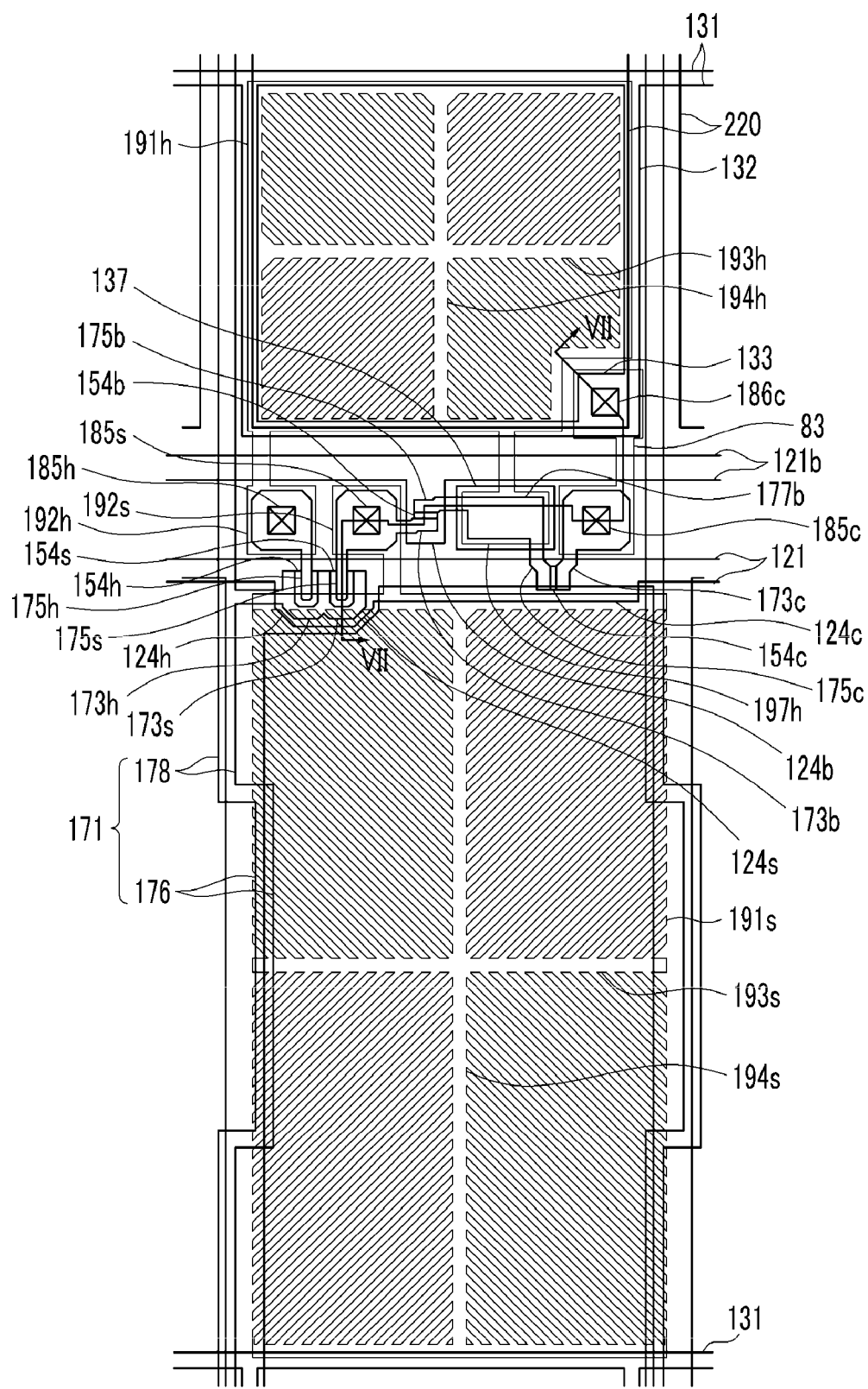
FIG. 6 is a layout view of a liquid crystal display according to an exemplary embodiment of the present invention.
Figure 7:
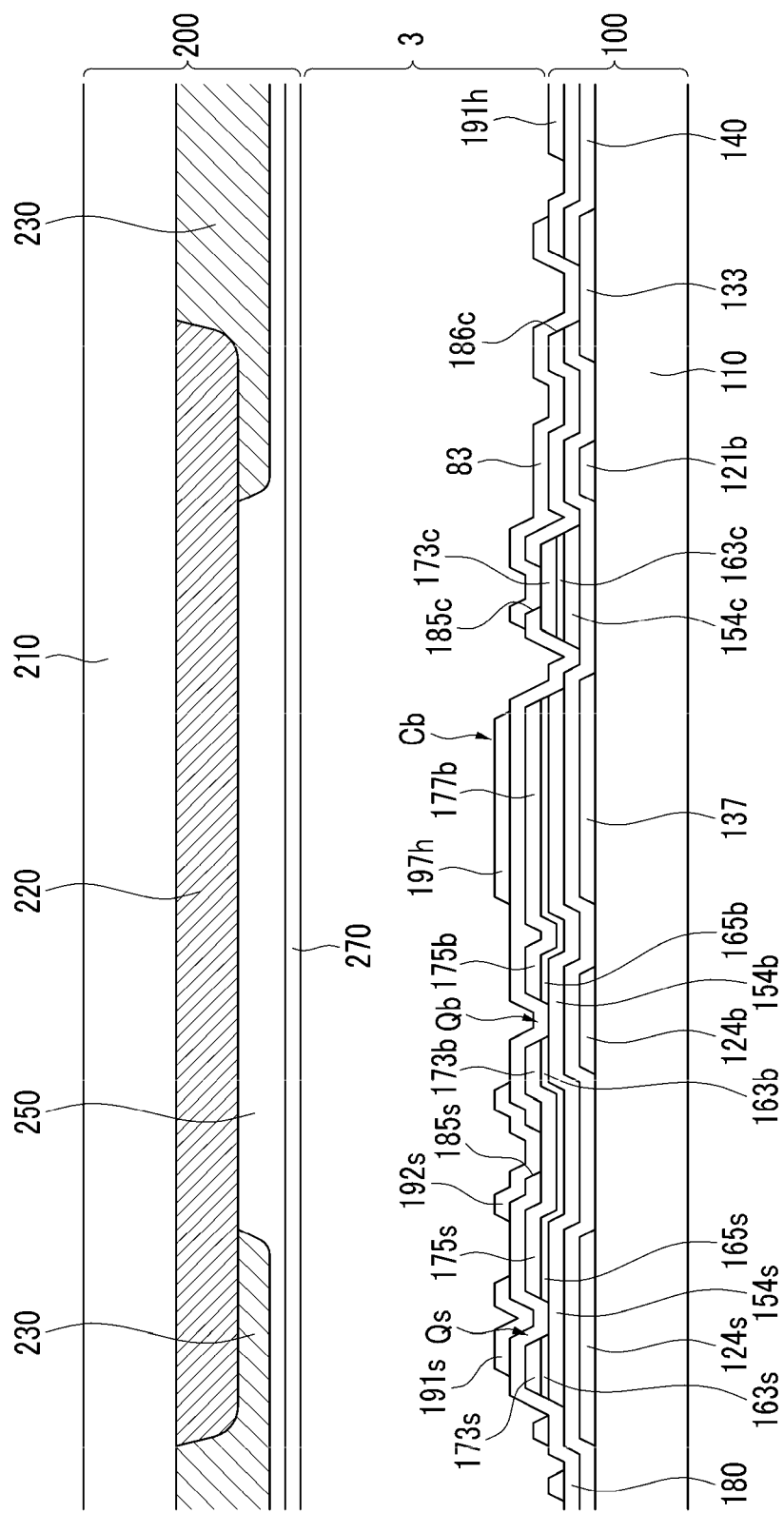
FIG. 7, FIG. 8, FIG. 9, FIG. 10, and FIG. 11 are cross-sectional views of the liquid crystal display of FIG. 6 taken along the line VII-VII.

FIG. 6 is a layout view of a liquid crystal display according to an exemplary embodiment of the present invention, and FIG. 7 is a cross-sectional view of the liquid crystal display shown in FIG. 6 taken along with the line VII-VII.

Referring to FIG. 6 and FIG. 7, a liquid crystal display according to an exemplary embodiment of the present invention includes a lower panel 100 and an upper panel 200 facing each other, and a liquid crystal layer 3 disposed between the two panels 100 and 200.

Firstly, the lower panel 100 will be described.

A plurality of gate conductors including a plurality of gate lines 121, a plurality of boosting gate lines 121b, a plurality of common voltage lines 131, and a light blocking member 137 are formed on an insulation substrate 110.

The gate lines 121 and the boosting gate lines 121b transmit gate signals and extend in a transverse direction. Each gate line 121 includes first, second, and third gate electrodes 124h, 124s, and 124c protruding downward. The first and second gate electrodes 124h and 124s are connected to each other, thereby forming one protrusion. The boosting gate line 121b includes a fourth gate electrode 124b protruding downward.

Each common voltage line 131 transmits the common voltage Vcom and includes a stem (not shown) and a hook-shaped portion 132. The stem is substantially parallel to the gate line 121 and the boosting gate line 121b, and the hook-shaped portion 132 extends downward from the stem, thereby forming a hook-shaped quadrangle. The hook-shaped portion 132 includes a contact portion 133 that protrudes toward the inside at the lower-right corner of the hook-shaped portion 132.

The light blocking member 137 may have a rectangular shape and is disposed between the gate line 121 and the boosting gate line 121b. Optionally, the light blocking member 137 may be omitted.

A gate insulating layer 140 is formed on the gate conductors 121, 121b, 131, and 137.

A plurality of semiconductor stripes (not shown) that may be made of amorphous or crystalline silicon are formed on the gate insulating layer 140. The semiconductor stripes extend substantially in the longitudinal direction, and include a plurality of curved portions that are curved in the right side. Each semiconductor stripe includes first and second semiconductors 154h and 154s extending toward the first and second gate electrodes 124h and 124s and connected to each other, a fourth semiconductor 154b connected thereto, and a third semiconductor 154c connected to the fourth semiconductor 154b.

A plurality of ohmic contact stripes (not shown) and a plurality of ohmic contact islands (a first (not shown), a second 165s, a third 163b, a fourth 165b, a fifth 163c and a sixth (not shown)) are formed on the semiconductor stripes. The ohmic contact stripes have a plurality of protrusions (a first (not shown) and a second 163s) extending according to the first and second semiconductors 154h and 154s of the semiconductor stripes. The first protrusion (not shown) and the second protrusion 163s are connected to each other. As illustrated in FIG. 7, the two ohmic contact islands 165s and 163b are connected to each other, and the fourth ohmic contact island 165b is connected to the sixth ohmic contact island.

The first protrusion of the ohmic contact stripe and the first ohmic contact island that are opposite to each other with respect to the first gate electrode 124h form a pair and are disposed on the first semiconductor 154h. The second protrusion 163s and the second ohmic contact island 165s that are opposite to each other with respect to the second gate electrode 124s form a pair and are disposed on the second semiconductor 154s. The third and fourth ohmic contact islands 163b and 165b are opposite to each other with respect to the fourth gate electrode 124b forming a pair disposed on the fourth semiconductor 154b. The sixth ohmic contact island (not shown) is opposite to the fifth ohmic contact island 163c with respect to the third gate electrode 124c forming a pair which is disposed on the third semiconductor 154c.

The ohmic contacts, for example, 163s, 165s, 163b, 165b and 163c, are preferably made of n+ hydrogenated a-Si heavily doped with an N-type impurity such as phosphorous, or they may be made of silicide.

A plurality of data conductors including a plurality of data lines 171, a plurality of third and fourth source electrodes 173c and 173b, and a plurality of first, second, third, and fourth drain electrodes 175h, 175s, 175c, and 175b are formed on the ohmic contacts 163s, 165h, 165s, 163b, 165b and 163c (including those not shown).

The data lines 171 transmit data signals and extend in the longitudinal direction, thereby intersecting the gate lines 121 and the boosting gate lines 121b. The data lines 171 include a stripe portion 178 intersecting the gate lines 121 and the boosting gate lines 121b, and a plurality of curved portions 176 curved along the semiconductor stripes. Each data line 171 includes the first and second source electrodes 173h and 173s extending toward the first and second gate electrodes 124h and 124s thereby together forming an "M" shape in the illustrated embodiment.

The second drain electrode 175s and the fourth source electrode 173b are connected to each other. The fourth drain electrode 175b and the third drain electrode 175c are connected to each other, and an expansion 177b having a wide area is disposed at the connection position. The expansion 177b overlaps the light blocking member 137.

One end of the first and second drain electrodes 175h and 175s are respectively opposite to the first and second source electrodes 173h and 173s with respect to the first and second gate electrodes 124h and 124s, and a portion thereof is enclosed by the first and second source electrodes 173h and 173s, respectively. The third and fourth source electrodes 173c and 173b and the third and fourth drain electrodes 175c and 175b are respectively opposite to each other with respect to the third and fourth gate electrodes 124c and 124b. The other end of the first and second drain electrodes 175h and 175s and the other end of the third source electrode 173c have a wide area for connection with another layer.

The first, second, third and fourth gate electrodes 124h, 124s, 124c and 124b, the first, second, third and fourth source electrodes 173h, 173s, 173c and 173b, and the first, second, third and fourth drain electrodes 175h, 175s, 175c and 175b form the first, second, third and fourth thin film transistors (TFTs) Qh, Qs, Qc and Qb along with the first, second, third and fourth semiconductors 154h, 154s, 154c and 154b, respectively. Respective channels of the first, second, third and fourth TFTs Qh, Qs, Qc and Qb are formed in the respective first, second, third and fourth semiconductors 154h, 154s, 154c and 154b between the respective first, second, third and fourth source electrodes 173h, 173s, 173c and 173b and the respective first, second, third and fourth drain electrodes 175h, 175s, 175c and 175b. FIG. 7 shows, for example, the second gate electrode 124s, the second source electrode 173s and the second drain electrode 175s form the second TFT Qs along with the second semiconductor 154s, such that, the channel of the second TFT Qs is formed in the second semiconductor 154s between the second source electrode 173s and the second drain electrode 175s.

The semiconductor stripe including the first, second, third, and fourth semiconductors 154h, 154s, 154c, and 154b has substantially the same plane shape as the data conductors (data line 171, third source electrode 173c, fourth source electrode 173b, first drain electrode 175h, second drain electrode 175s, third drain electrode 175c, and fourth drain electrode 175b) and the ohmic contacts (protrusion of the ohmic contact stripe 163s and ohmic contact islands 165s, 163b, 165b, and 163c) thereunder, except for the channel regions between respective source electrodes 173h, 173s, 173c, and 173b, and drain electrodes 175h, 175s, 175c, and 175b. That is, the first, second, third and fourth semiconductors 154h, 154s, 154c, and 154b include a portion between respective source electrodes 173h, 173s, 173c, and 173b and drain electrodes 175h, 175s, 175c, and 175b, and portions exposed by the data conductors 171, 173c, 173b, 175h, 175s, 175c, 175b.

The ohmic contacts 163s, 165s, 163b, 165b, 163c (including the first and sixth ohmic contact islands and the first ohmic contact protrusion, which are not shown) are interposed only between the underlying semiconductors 154h, 154s, 154c, 154b, and the overlying data conductors 171, 173c, 173b, 175h, 175s, 175c, 175b, and reduce the contact resistance therebetween.

A passivation layer 180 made of an inorganic insulator such as silicon nitride or silicon oxide is formed on the data conductors 171, 173c, 173b, 175h, 175s, 175c, and 175b, and the exposed semiconductors 154h, 154s, 154c, and 154b. The passivation layer 180 has a plurality of first and second contact holes 185h and 185s exposing the first and second drain electrodes 175h and 175s, and a plurality of third contact holes 185c exposing the third source electrodes 173c. The passivation layer 180 and the gate insulating layer 140 have a plurality of fourth contact holes 186c exposing the contact portions 133 of the common voltage line 131.

A plurality of the first and second subpixel electrodes 191h and 191s and a plurality of overpasses 83 are formed on the passivation layer 180.

The first subpixel electrode 191h is substantially quadrangular-shaped, and has a transverse stem 193h, a longitudinal stem 194h, and two protrusions 192h and 197h protruded downward.

The first subpixel electrode 191h is partitioned into four subregions by the transverse stem 193h and the longitudinal stem 194h. Each subregion includes a plurality of first, second, third and fourth minute branches that extend obliquely from the transverse stem 193h and the longitudinal stem 194h to the outside. The minute branches of a respective subregion are aligned at an angle of about 45 degrees or 135 degrees to the gate lines 121 or the transverse stem 193h. Also, the minute branches of two neighboring sub-regions may be perpendicular.

The first subpixel electrode 191h receives the data voltages from the first drain electrode 175h through the protrusion 192h. Also, the protrusion 197h forms an approximate rectangle, and overlaps the expansion 177b connected between the fourth drain electrode 175b and the third drain electrode 175c via the passivation layer 180, thereby forming the boosting capacitor Cb.

The second subpixel electrode 191s includes a transverse stem 193s, a longitudinal stem 194s, and a protrusion 192s protruded upward. The second subpixel electrode 191s is higher than the first subpixel electrode 191h by about one to three times. The second subpixel electrode 191s receives the data voltages from the second drain electrode 175s through the protrusion 192s. The description of subregions, minute branches, the transverse stem 191s and the longitudinal stem 193s of the second subpixel electrode 191s is similar to that for the first subpixel electrode 191h such that further detail is omitted here.

On the other hand, the first and second subpixel electrodes 191h and 191s are disposed above and below the gate line 121 and the boosting gate line 121b in FIG. 6. The first subpixel electrode 191h may be disposed such that it does not overlap the gate line 121 or the boosting gate line 121b, and the upper portion of the second subpixel electrode 191s may be disposed such that it partially overlaps the gate line 121. In such an embodiment, the first and second subpixel electrodes 191h and 191s do not overlap the gate line 121 or the boosting gate line 121b, or the overlapping area thereof is minimized, such that a kick-back voltage due to parasitic capacitance may be reduced. Thus, when a gate driver (not shown) for driving the thin film transistor is integrated in the lower panel 100, the size of the gate driver may be correspondingly reduced.

The lower portion of the first subpixel electrode 191h overlaps the hook-shaped portion 132 of the common voltage line 131 such that light leakage may be covered under the first subpixel electrode 191h.

The overpass 83 is electrically connected to the contact portion 133 of the common voltage line 131, and the third source electrode 173c through the contact holes 185c and 186c, and the third source electrode 173c receives the common voltage Vcom through the overpass 83.

The first and second subpixel electrodes 191h and 191s and the overpass 83 may be made of a transparent conductor such as indium tin oxide (ITO) and indium zinc oxide (IZO).

An alignment layer (not shown) may be formed on the first and second subpixel electrodes 191h and 191s, and the overpass 83.

Next, the upper panel 200 will be described.

Referring to FIG. 7, a light blocking member 220 (black matrix) is formed on an insulation substrate 210. The light blocking member 220 prevents light leakage and includes a plurality of longitudinal portions formed according to the data lines 171 and a plurality of transverse portions formed according to the gate lines 121 and the boosting gate lines 121b, and a plurality of openings. The transverse portion of the light blocking member 220 substantially covers a portion between the first and second subpixel electrodes 191h and 191s.

A plurality of color filters 230 are formed on the insulation substrate 210 and the light blocking member 220. Most of each color filter 230 is disposed in a respective opening of the light blocking member 220. The color filters 230 may be formed with an island shape on the region corresponding to the first and second subpixel electrodes 191h and 191s, or according to the column of the first and second subpixel electrodes 191h and 191s. Each color filter 230 may display one of a primary color such as one of the three primary colors of red, green, and blue.

An overcoat 250 is formed on the color filter 230 and the light blocking member 220. The overcoat 250 may be made of an (organic) insulating material. The overcoat 250 prevents the color filter 230 from being exposed and provides a flat surface. In an optional embodiment the overcoat 250 may be omitted.

The common electrode 270 is formed on the overcoat 250. The common electrode 270 may be made of the transparent conductor such as ITO and IZO.

An alignment layer (not shown) may be formed on the common electrode 270.

Polarizers (not shown) may be provided on the outer surface of the display panels 100 and 200.

The liquid crystal layer 3 between the lower panel 100 and the upper panel 200 has negative dielectric anisotropy, and may be oriented such that the major axes of the liquid crystal molecules of the liquid crystal layer 3 are substantially perpendicular to the surfaces of the two display panels 100 and 200 when no electric field is applied.

When the gate lines 121 are applied with the gate signals, the first and second subpixel electrodes 191h and 191s become applied with respective data voltages to form an electric field along with the common electrode 270 which is applied with the common voltage Vcom. The liquid crystal molecules of the liquid crystal layer 3 change orientation (rotate) so that the major axes thereof become substantially perpendicular to a direction of the electric field in response to the electric field. The inclination degree of the liquid crystal molecules changes the degree of polarization of light that is incident to the liquid crystal layer 3. The change in degree of polarization is proportional to the inclination degree of the liquid crystal molecules, and this change of the incident light polarization appears as a change of the light transmittance by the polarizer, thereby displaying an image of the liquid crystal display.

The first and second subpixel electrodes 191h and 191s and the common electrode 270 form first and second liquid crystal capacitors Clch and Clcs along with the liquid crystal layer 3 therebetween respectively to maintain applied voltages even after the first and second thin film transistors Qh and Qs are turned off.

The first and second subpixel electrodes 191h and 191s overlap the common voltage line 131 including the hook-shaped portion 132 with the passivation layer 180 and the gate insulating layer 140 interposed therebetween, thereby forming the first and second storage capacitors Csth and Csts to enhance the voltage storing capacity of the respective first and second liquid crystal capacitors Clch and Clcs.

As shown in FIG. 6, according to an exemplary embodiment of the present invention, the first, second, third, and fourth thin film transistors Qh, Qs, Qc, and Qb and the boosting capacitor Cb are disposed on a region where light is not transmitted, that is, where the gate line 121 and the boosting gate line 121b between the first and second subpixel electrodes 191h and 191s are disposed. Accordingly, the aperture ratio of the transmission region where the first and the second subpixel electrodes 191h and 191s are disposed may be increased and the transmittance may be increased.

Also, the data line 171 is curved such that cross talk due to the parasitic capacitance between the data line 171, and the first and second subpixel electrodes 191h and 191s, may be reduced.

Next, various cross-sectional structures of the liquid crystal display shown in FIG. 6 according to another exemplary embodiment will be described with reference to FIG. 8, FIG. 9, FIG. 10, and FIG. 11 as well as FIG. 6.

FIG. 8, FIG. 9, FIG. 10, and FIG. 11 are cross-sectional views of the liquid crystal display shown in FIG. 6 taken along the line VII-VII.

The same constituent elements as that of the previous exemplary embodiments described above are indicated by the same reference numerals and apply to the following description. However, for clarity and brevity the same detailed description of the same elements will not be repeated here.

Figure 8:
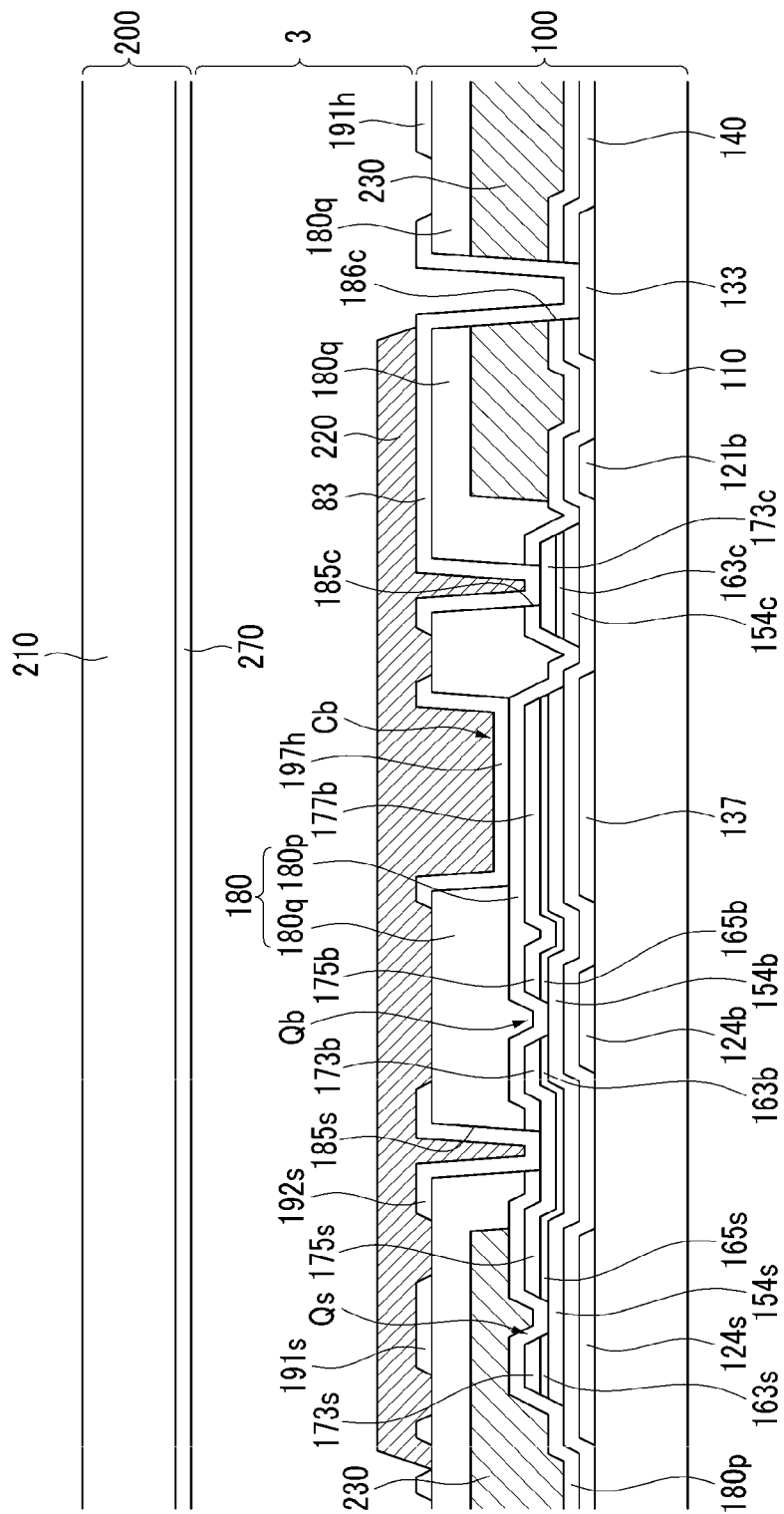

Referring to FIG. 6 and FIG. 8, the passivation layer 180 includes a lower passivation layer 180p preferably made of the inorganic insulator such as silicon nitride or silicon oxide, and an upper passivation layer 180q preferably made of an organic insulator. The organic insulator of the upper passivation layer 180q may have positive or negative photosensitivity, the dielectric constant thereof may be about 4.0 or less, and the surface thereof may flat. The lower passivation layer 180p may prevent the pigment of the color filter 230 from flowing into the exposed semiconductors 154h, 154s, 154c, and 154b.

In the embodiment shown in FIG. 8, the color filters 230 are disposed in the lower panel 100 between the lower passivation layer 180p and the upper passivation layer 180q. A plurality of contact holes 186c exposing the contact portion 133 of the common voltage line 131 may pass through the color filters 230.

The light blocking member 220 is also disposed in the lower panel 100, and is formed on the first and second subpixel electrodes 191h and 191s, the overpass 83, and upper passivation layer 180q. This light blocking member 220 may be formed with the same layer as a spacer (not shown) for maintaining the interval of the liquid crystal layer 3. Accordingly, the light blocking member 220 and the spacer may be simultaneously formed, improving the manufacturing process and reducing the manufacturing cost of the liquid crystal display in such an exemplary embodiment.

Accordingly, when the color filter 230 and the light blocking member 220 are positioned in the lower panel, the aperture ratio and transmittance of the liquid crystal display may be increased.

Figure 9:
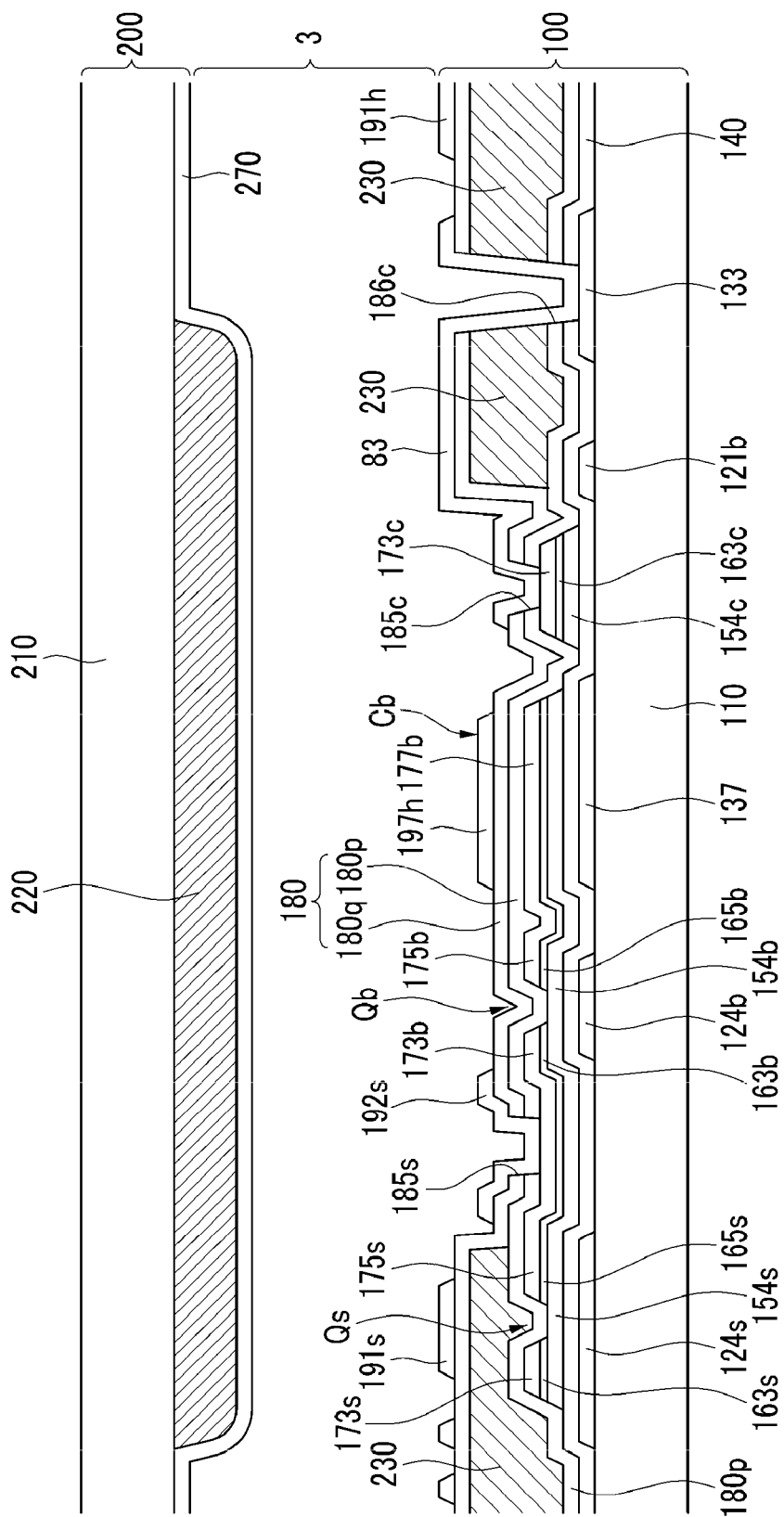

Next, referring to FIG. 6 and FIG. 9, the passivation layer 180 includes a lower passivation layer 180p preferably made of the inorganic insulator such as silicon nitride or silicon oxide, and an upper passivation layer 180q. The lower passivation layer 180p may prevent the pigment of the color filter 230 from flowing into the exposed semiconductors 154h, 154s, 154c, and 154b. The upper passivation layer 180q may include the organic insulator.

The light blocking member 220 is disposed on the insulation substrate 210 of the upper panel 200, however the color filter 230 is disposed between the lower passivation layer 180p and the upper passivation layer 180q of the lower panel 100. The contact hole 186c may pass through the color filter 230.

Figure 10:
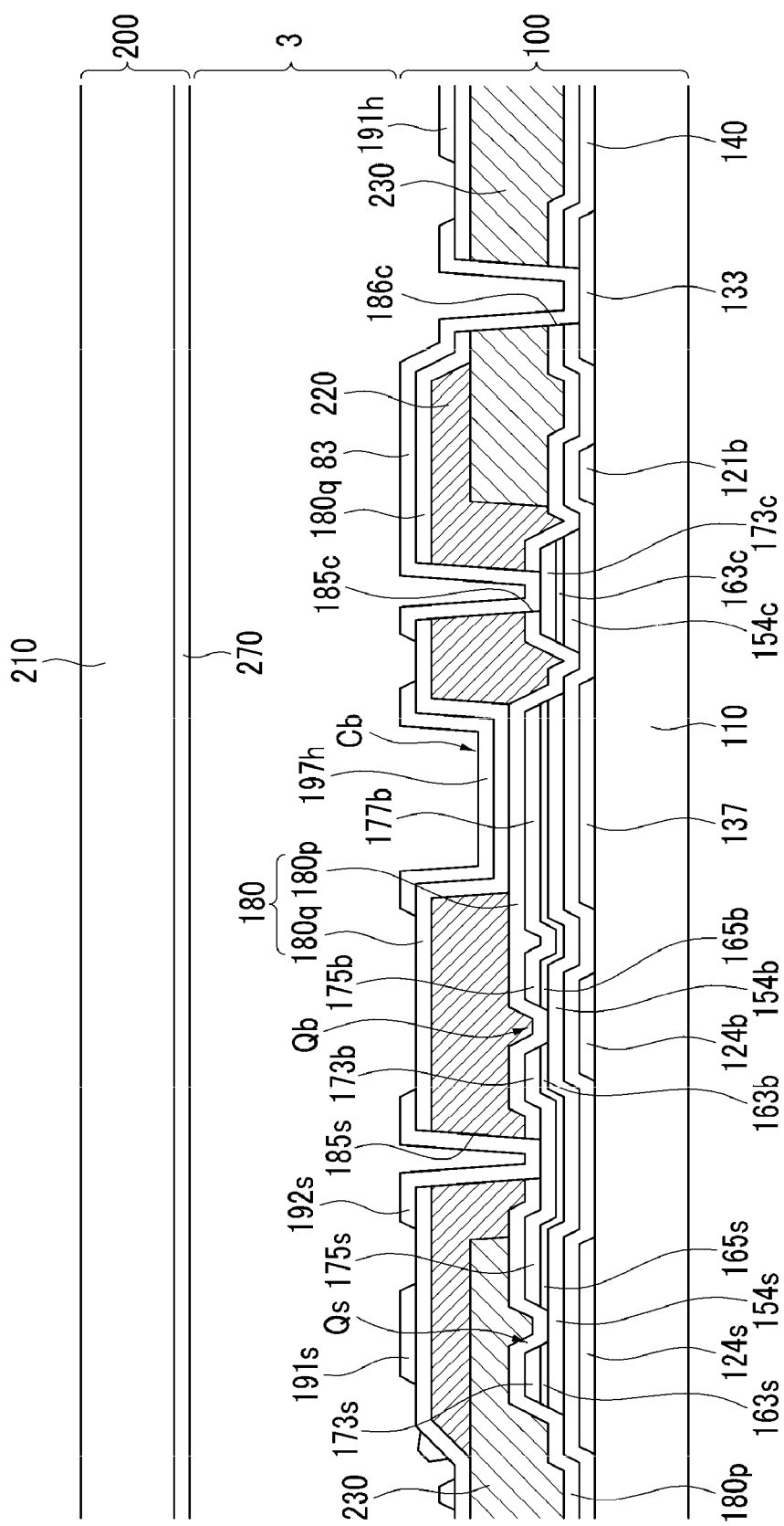

Next, referring to FIG. 6 and FIG. 10, a liquid crystal display according to the present exemplary embodiment has the same cross-sectional structure as that shown of FIG. 8, however the structures of the light blocking member 220 and the passivation layer 180 are different therefrom.

In the illustrated embodiment of FIG. 8, the passivation layer 180 includes a lower passivation layer 180p preferably made of the inorganic insulator such as silicon nitride or silicon oxide, and an upper passivation layer 180q. The upper passivation layer 180q may include the organic insulator.

The light blocking member 220 is disposed under the upper passivation layer 180q, and is primarily disposed between neighboring color filters 230. Accordingly, the contact holes 185h, 185s, and 185c may pass through the light blocking member 220 overlapping them. Also, a portion of the light blocking member 220 is removed between the protrusion 197h of the first subpixel electrode 191h and the expansion 177b forming the boosting capacitor Cb such that a sufficient capacitance of the boosting capacitor Cb may be obtained.

Figure 11:
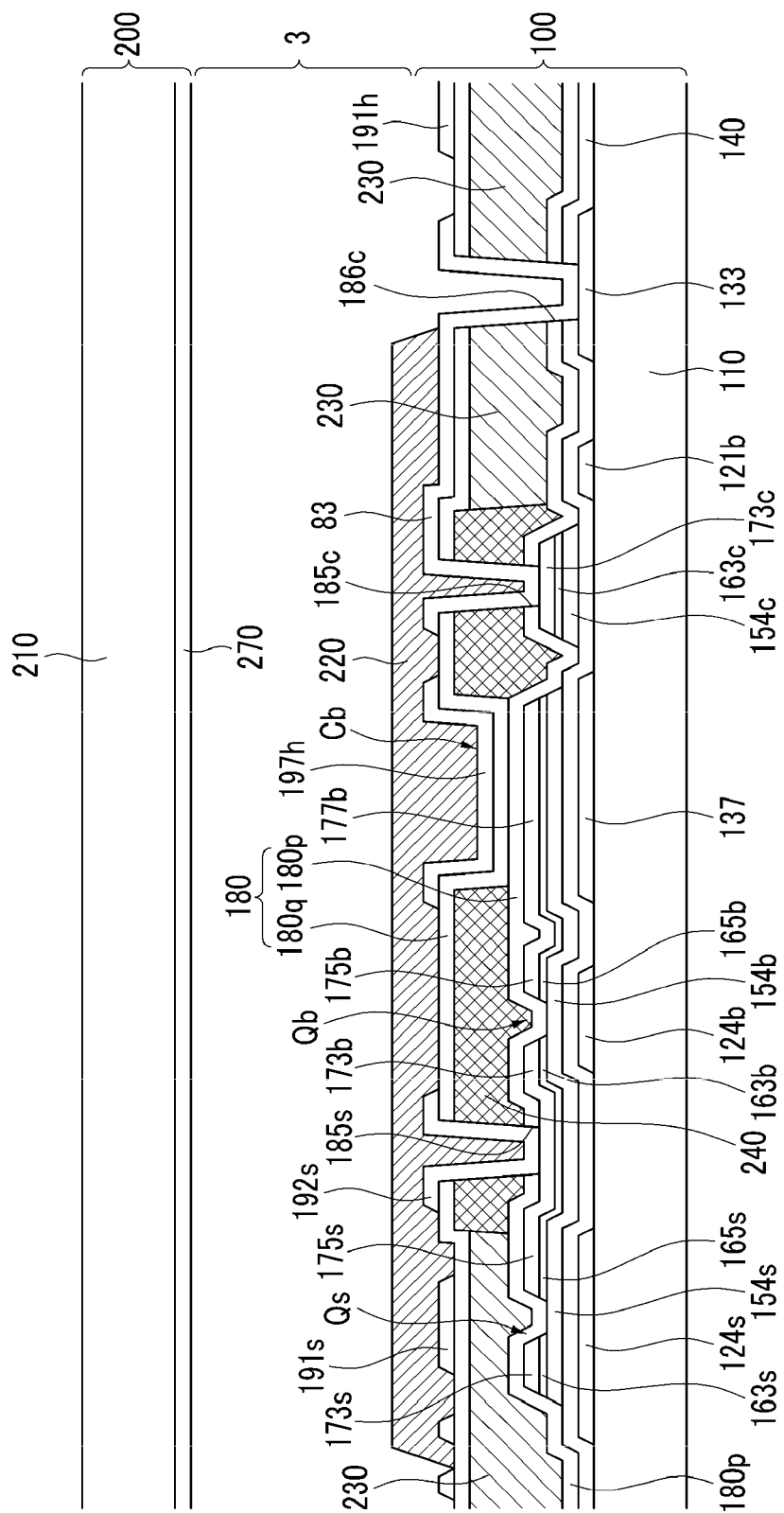

Referring to FIG. 6 and FIG. 11, the passivation layer 180 includes a lower passivation layer 180p that may be made of an inorganic insulator such as silicon nitride or silicon oxide, and an upper passivation layer 180q. The upper passivation layer 180q may be made of the organic insulator having the flat surface and the photosensitivity. When the upper passivation layer 180q is made of the organic insulator, a portion of the upper passivation layer 180q is removed between the protrusion 197h of the first subpixel electrode 191h and the expansion 177*b* forming the boosting capacitor Cb (FIG. 8) such that a sufficient capacitance of the boosting capacitor Cb may be obtained.

A partition 240 is formed on the lower passivation layer 180*p*. The partition 240 encloses each edge or all edges of the first and second subpixel electrodes 191*h* and 191*s* thereby defining openings like a bank, and may be made of the organic insulator or the inorganic insulator. A portion of the partition 240 is removed between the protrusion 197*h* of the first subpixel electrode 191*h* and the expansion 177*b* forming the boosting capacitor Cb such that the capacitance of the boosting capacitor Cb may be obtained.

The partition 240 may be made of a photoresist including black pigments, and the partition 240 functions as the light blocking member, thereby simplifying the formation process thereof.

The partition 240 can be positioned between two color filters 230 that may be formed through inkjet printing.

The light blocking member 220 is also disposed in the lower panel 100, and is formed on the first and second subpixel electrodes 191*h* and 191*s*, the overpass 83, and the upper passivation layer 180*q*. This light blocking member 220 may be formed with the same layer as a spacer (not shown) for maintaining the interval of the liquid crystal layer 3. The partition 240 may be made of a photoresist including black pigments, and the partition 240 functions as a light blocking member such that the light blocking member 220 may be omitted.

In the liquid crystal display of FIG. 8, FIG. 9, FIG. 10, and FIG. 11, the upper passivation layer 180*q* prevents the color filters 230 from lifting and suppresses contamination of the liquid crystal layer 3 by organic materials such as a solvent flowing from the color filters 230 such that defects such as an afterimage that may be generated during driving may be prevented.

Next, a liquid crystal display according to another exemplary embodiment of the present invention will be described with reference to FIG. 12.

Figure 12:
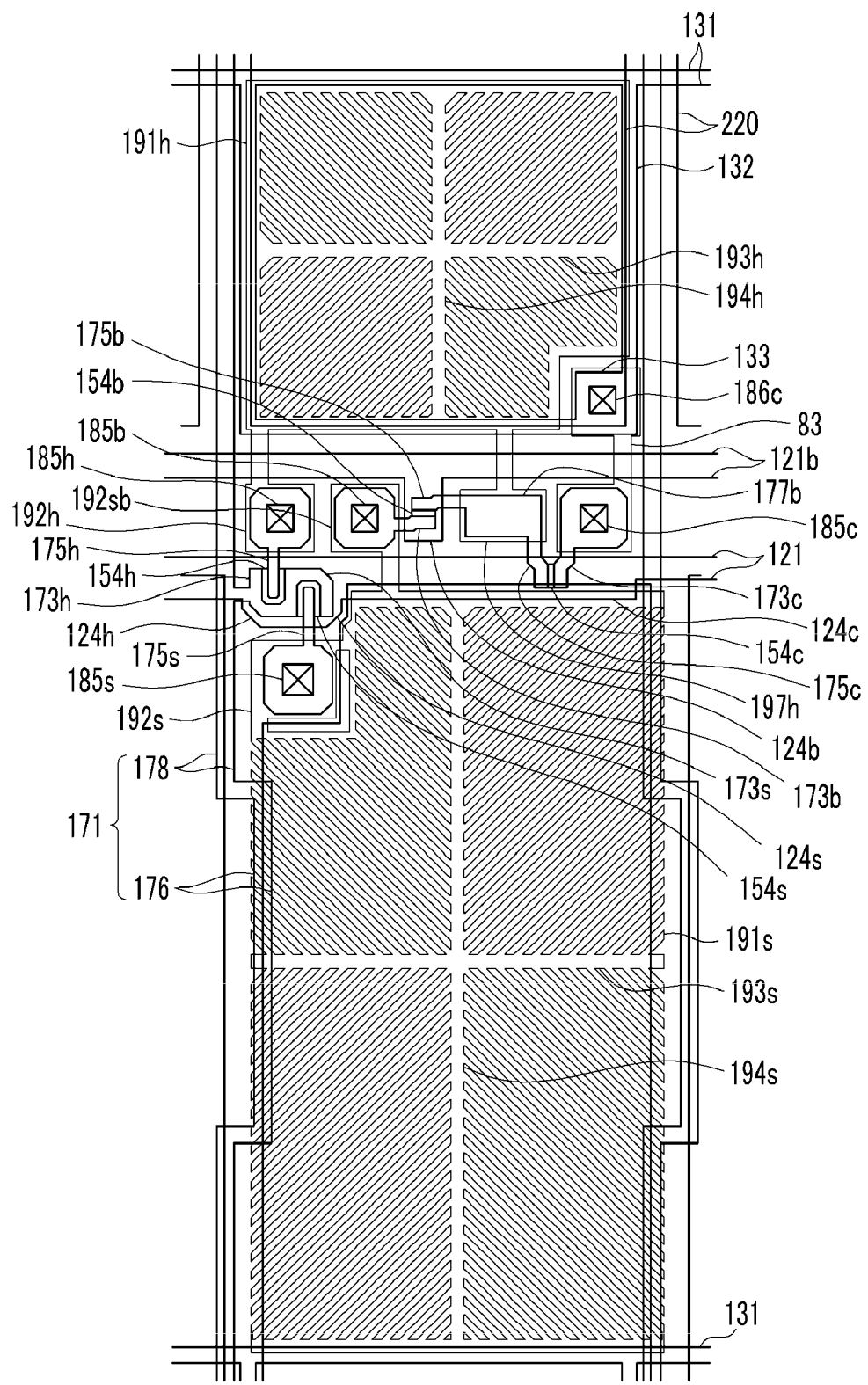
FIG. 12 and FIG. 13 are layout views of a liquid crystal display according to an exemplary embodiment of the present invention.

FIG. 12 is a layout view of a liquid crystal display according to an exemplary embodiment of the present invention.

The layered structure of a liquid crystal display according to the present exemplary embodiment is almost the same as that of the liquid crystal display shown in FIG. 6 to FIG. 11. The same constituent elements as the exemplary embodiments of FIG. 6 through FIG. 11 are indicated by the same reference numerals, and the same description thereof is omitted.

Referring to FIG. 12, the liquid crystal display according to the present exemplary embodiment has almost the same structure as that of the liquid crystal display shown in FIG. 6, however the structure of the first and second source electrodes 173*h* and 173*s*, the second drain electrode 175*s*, the second contact hole 185*s*, the fourth source electrode 173*b*, and the protrusion of the second subpixel electrode 191*s* are different therefrom.

The directions of the opened portions of the first and second source electrodes 173*h* and 173*s* are opposite to each other, and the opened portion of the second source electrode 173*s* faces downward in FIG. 12. The second drain electrode 175*s* is disposed under the second source electrode 173*s*, and is electrically connected to the protrusion 192*s* of the second subpixel electrode 191*s* through the second contact hole 185*s*. The protrusion 192*s* is disposed at the left-upper corner of the second subpixel electrode 191*s*.

The fourth source electrode 173*b* is separated from the second drain electrode 175*s*. The fourth source electrode 173*b* is electrically connected to the protrusion 192*sb* of the second subpixel electrode 191*s* through the contact hole 185*b* of the passivation layer 180.

Accordingly, the fourth source electrode 173*b* receives the voltage of the second subpixel electrode 191*s*, separately from the second drain electrode 175*s*.

In the present exemplary embodiment, an additional light blocking film does not exist under the protrusion 197*h* of the first subpixel electrode 191*h* and the expansion 177*b* forming the boosting capacitor Cb.

Next, a liquid crystal display according to another exemplary embodiment of the present invention will be described with reference to FIG. 13.

Figure 13:
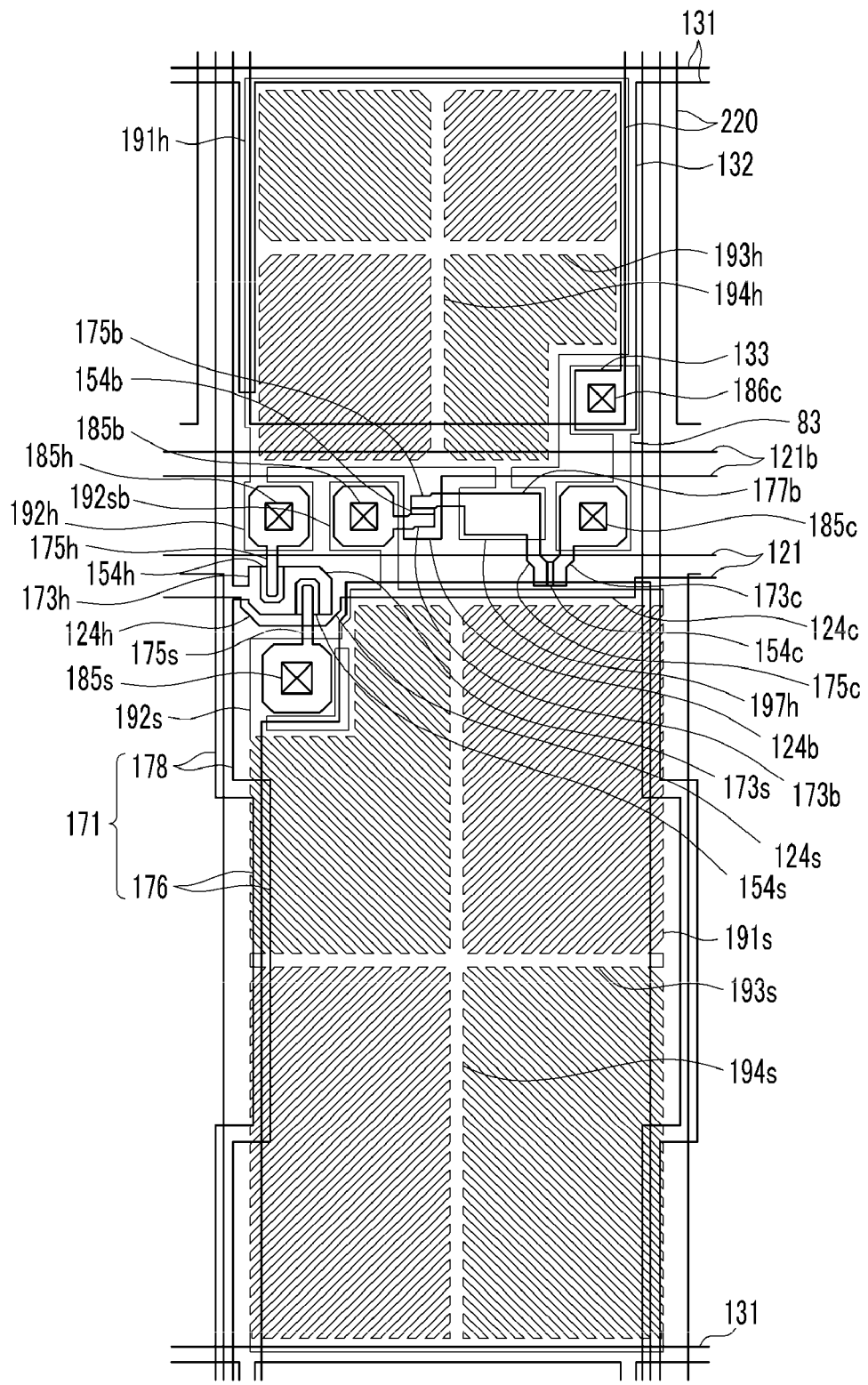

FIG. 13 is a layout view of a liquid crystal display according to an exemplary embodiment of the present invention.

The layered structure of a liquid crystal display according to the present exemplary embodiment is almost the same as that of the liquid crystal display shown in FIG. 6 to FIG. 11. The same constituent elements as of the exemplary embodiment of FIG. 6 to FIG. 11 are indicated by the same reference numerals, and the same description thereof is omitted.

Referring to FIG. 13, the liquid crystal display according to the present exemplary embodiment has almost the same structure as that of the liquid crystal display shown in FIG. 6, however the shape of the hook-shaped portion 132 of the common voltage line 131 and of the lower portion of the first subpixel electrode 191*h* are different. The lower transverse portion of the hook-shaped portion 132 is omitted in the embodiment illustrated in FIG. 13, and the lower portion of the first subpixel electrode 191*h* is extended to the boosting gate line 121*b* and overlaps a portion thereof. Accordingly, the aperture ratio may be increased, and the light leakage may be reduced near the boosting gate line 121*b*.

Next, an arrangement of signal lines and pixels of the liquid crystal display shown in FIG. 1 and FIG. 2 according to another exemplary embodiment of the present invention will be described with reference to FIG. 14 as well as FIG. 1 and FIG. 2.

Figure 14:
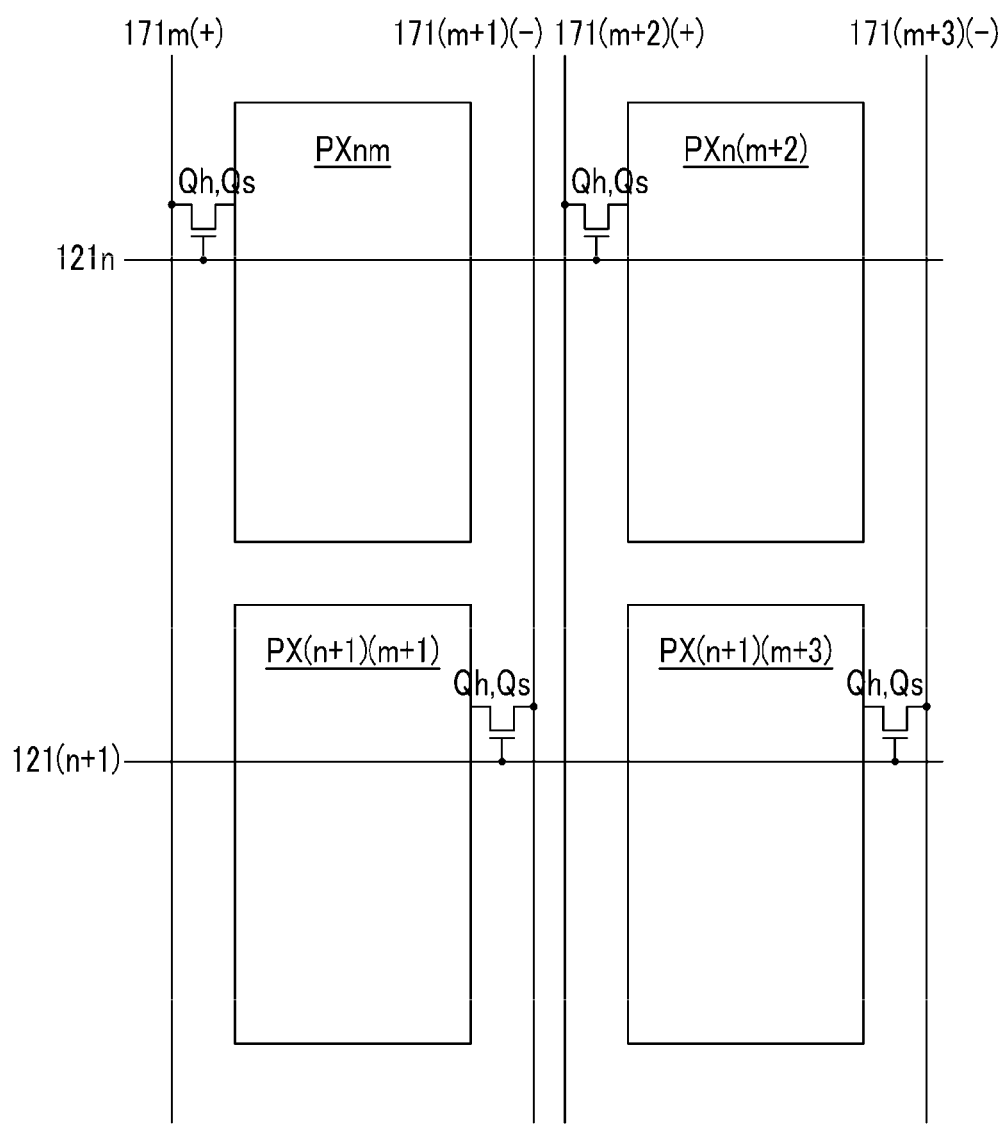
FIG. 14 is a layout view showing a signal line, a thin film transistor, and a pixel electrode in a liquid crystal display according to an exemplary embodiment of the present invention.

FIG. 14 is a layout view showing a signal line, a thin film transistor, and a pixel electrode in a liquid crystal display according to an exemplary embodiment of the present invention.

Referring to FIG. 14, the liquid crystal display according to the present exemplary embodiment has almost the same arrangement as of the liquid crystal display shown in FIG. 4, however two of data lines 171*m*, 171(*m*+1), 171(m+2), and 171(*m*+3) are disposed between the pixel rows. That is, the first and second switching elements Qh and Qs that are neighboring in the column direction are alternately connected to two of data lines 171*m*, 171(*m*+1), 171(m+2), and 171(*m*+3) disposed on both sides of the pixels PXnm, PXn(m+2), PX(n+1)(m+1), and PX(n+1)(m+3). Accordingly, when the data voltages having the opposite polarity are applied to the data lines 171*m*, 171(*m*+1), 171(m+2), and 171(*m*+3), a line inversion or dot inversion driving method is implemented.

In the present exemplary embodiment, the gate lines 121*n* and 121(*n*+1) form a pair and may be applied with the same gate signal.

Next, one exemplary embodiment of a driving method of the liquid crystal display shown in FIG. 1, FIG. 2, and FIG. 14 will be described with reference to FIG. 15.

Figure 15:
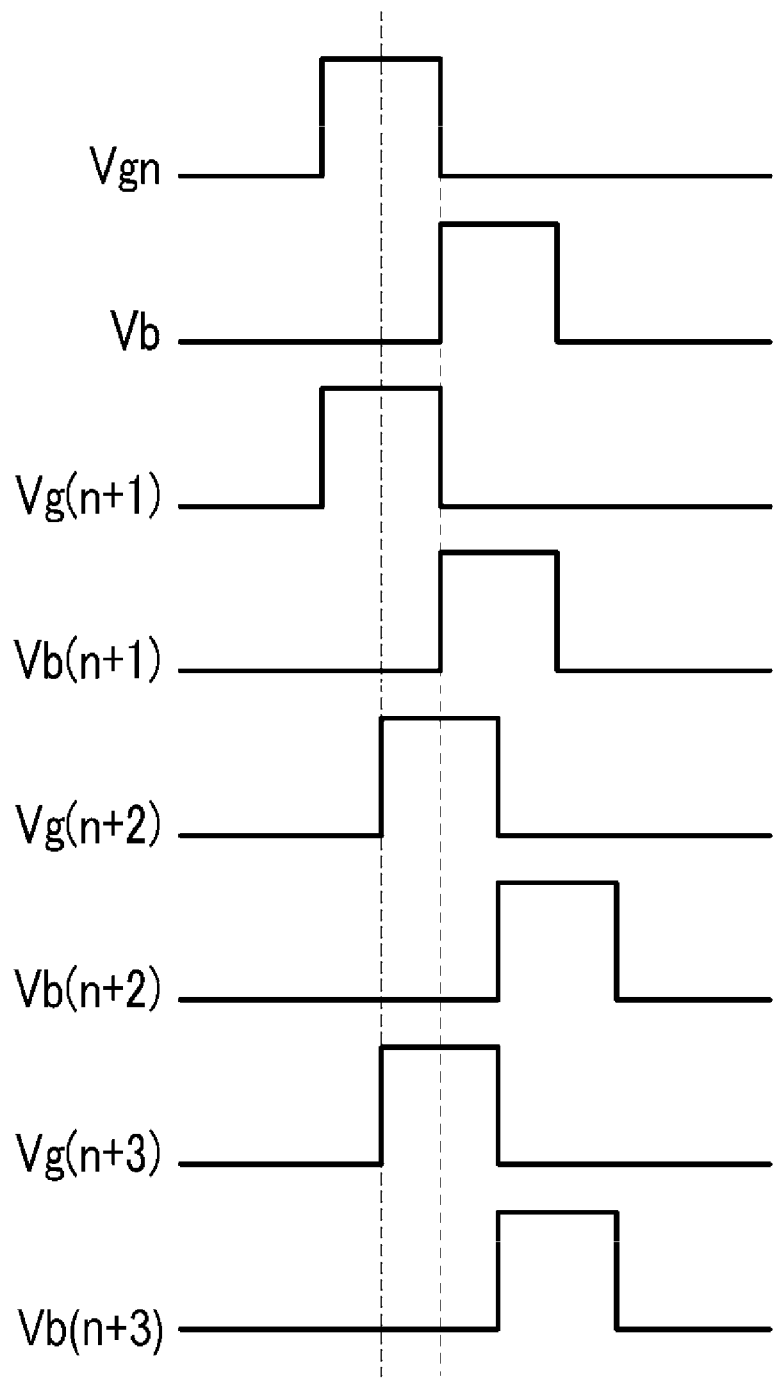
FIG. 15 is a waveform diagram showing a gate signal of a liquid crystal display according to an exemplary embodiment of the present invention.

FIG. 15 is a waveform diagram showing a gate signal of a liquid crystal display according to an exemplary embodiment of the present invention.

The driving method according to the present exemplary embodiment is almost the same as the driving method of FIG. 5. However, as shown in FIG. 15, the neighboring gate lines 121n and 121(n+1) are applied in a pair with the same gate signal. That is, the gate signal Vgn of the n-th gate line 121n and the gate signal Vg(n+1) of the (n+1)-th gate line 121(n+1) are the same, and the gate signal Vg(n+2) of the (n+2)-th gate line (not shown) and the gate signal Vg(n+3) of the (n+3)-th gate line (not shown) are the same. The gate signals Vb, Vb(n+1), Vb(n+2), and Vb(n+3) of the boosting gate line 121b [referring to FIG. 1 and FIG. 2] are applied in pairs with the same gate signal.

In this way, when the column of each pixel PX is connected to two data lines 171, and two rows of the neighboring pixels PX are applied with the same gate signal, the structure of the gate driver may be simplified.

Next, the detailed structure of the liquid crystal display shown in FIG. 14 will be described with reference to FIG. 16 and FIG. 17 as well as FIG. 1, FIG. 2, and FIG. 14.

Figure 16:
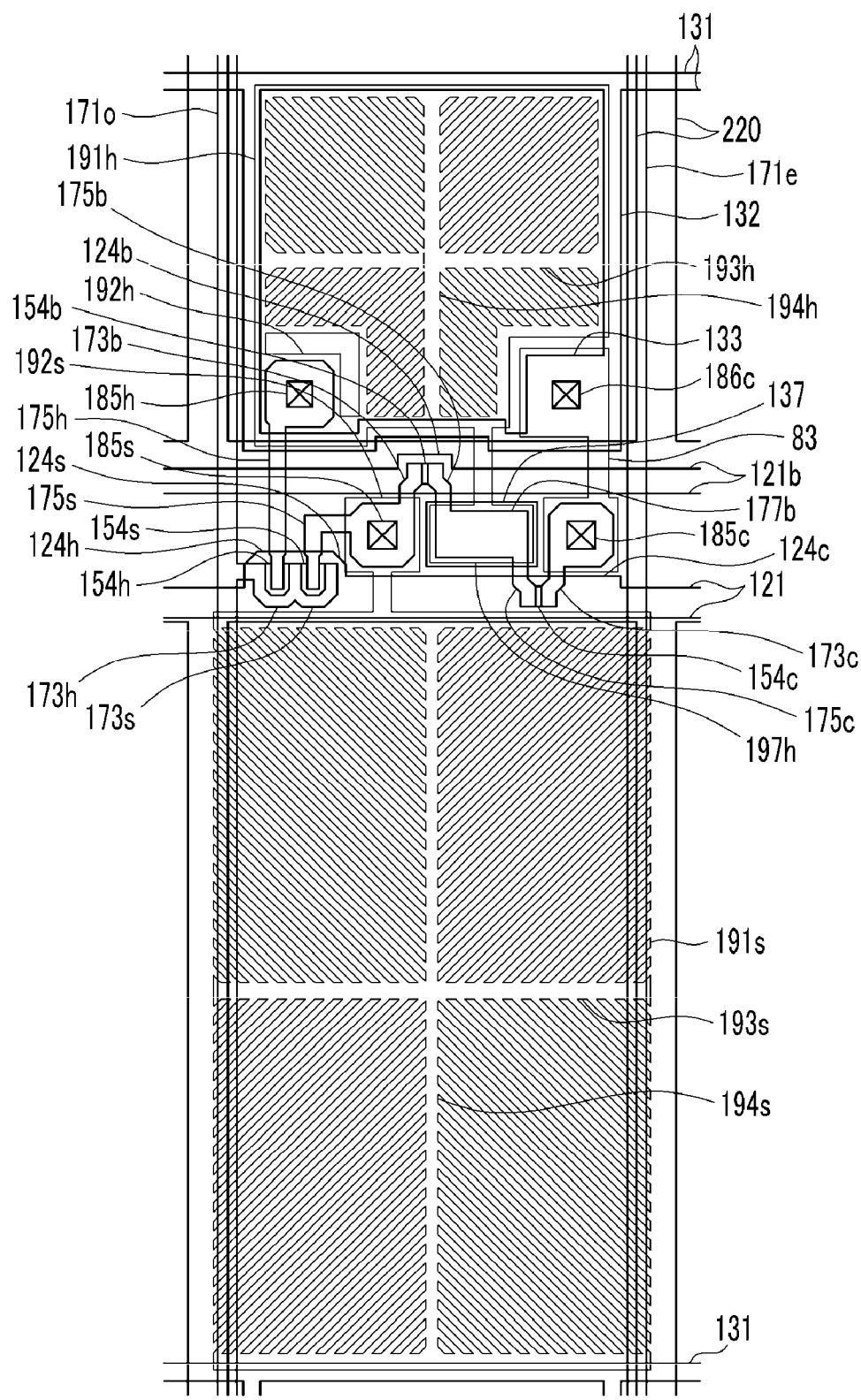
FIG. 16 is a layout view of a liquid crystal display according to an exemplary embodiment of the present invention.
Figure 17:
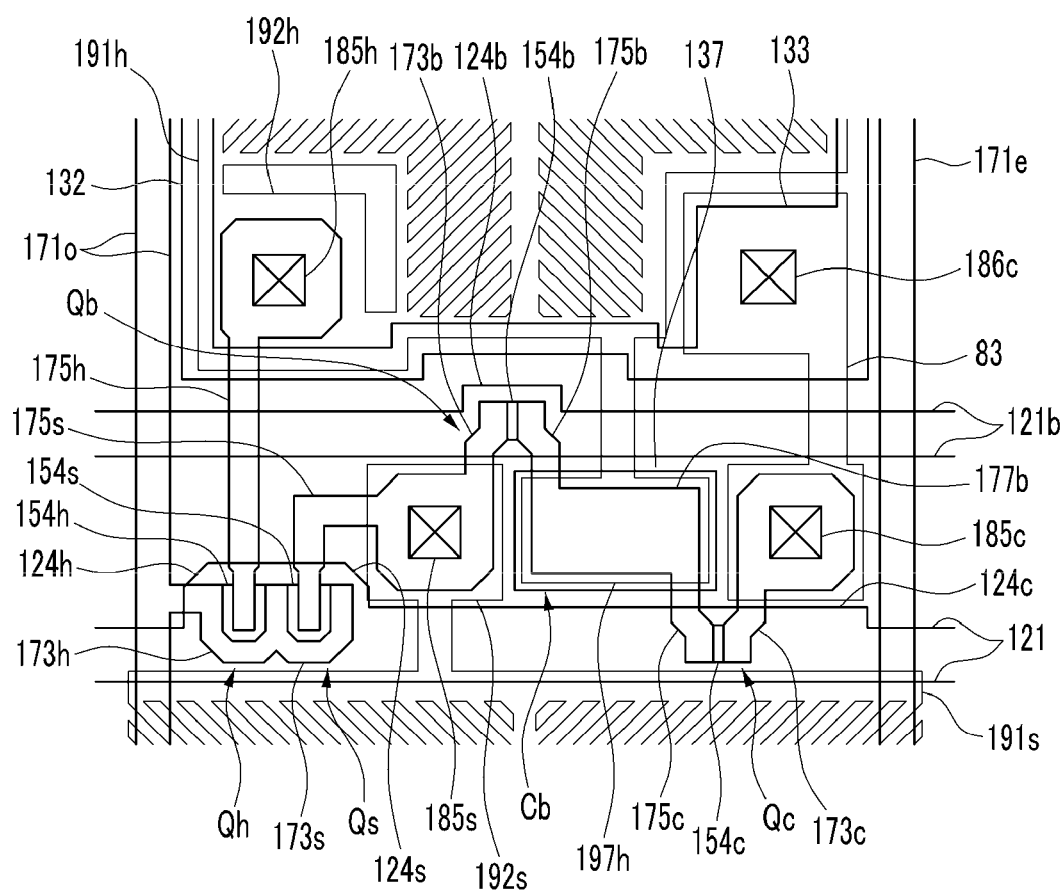
FIG. 17 is an enlarged layout view of the portion shown in FIG. 16.

FIG. 16 is a layout view of a liquid crystal display according to an exemplary embodiment of the present invention, and FIG. 17 is an enlarged layout view of a portion shown in FIG. 16.

The layered structure of a liquid crystal display according to the present exemplary embodiment is almost the same as that of the liquid crystal display shown in FIG. 6 through FIG. 11. The same constituent elements as of the exemplary embodiments of FIG. 6 to FIG. 11 are indicated by the same reference numerals, and as such the same detailed description thereof is omitted here.

Referring to FIG. 16 and FIG. 17, the liquid crystal display according to the present exemplary embodiment includes first and second data lines 171o and 171e that are disposed on opposite sides of the first and second subpixel electrodes 191h and 191s. The first and second data lines 171o and 171e extend in the column direction without any curved portion.

The first and second source electrodes 173h and 173s of the embodiment illustrated in FIG. 16 are connected to the first data line 171o, and although not shown, the first and second source electrodes 173h and 173s of the pixel PX neighboring in the column direction are connected to the second data line 171e.

The first contact hole 185h for the connection of the first subpixel electrode 191h and the first drain electrode 175h, and the protrusion 192h of the first subpixel electrode 191h, are disposed at the left-lower corner of the first subpixel electrode 191h. Accordingly, the first contact hole 185h is symmetrical with the contact hole 186c exposing the contact portion 133 of the common voltage line 131, and the opening shape according to the viewing angle may be the same.

The first, second, third, and fourth gate electrodes 124h, 124s, 124c, and 124b are protruded upward from the gate line 121 and the boosting gate line 121b. Accordingly, the arrangement and shape of each constituent element of the first, second, third, and fourth thin film transistors Qh, Qs, Qc, and Qb may be different from the arrangement and shape of FIG. 6.

Next, a liquid crystal display according to another exemplary embodiment of the present invention will be described with reference to FIG. 18.

Figure 18:
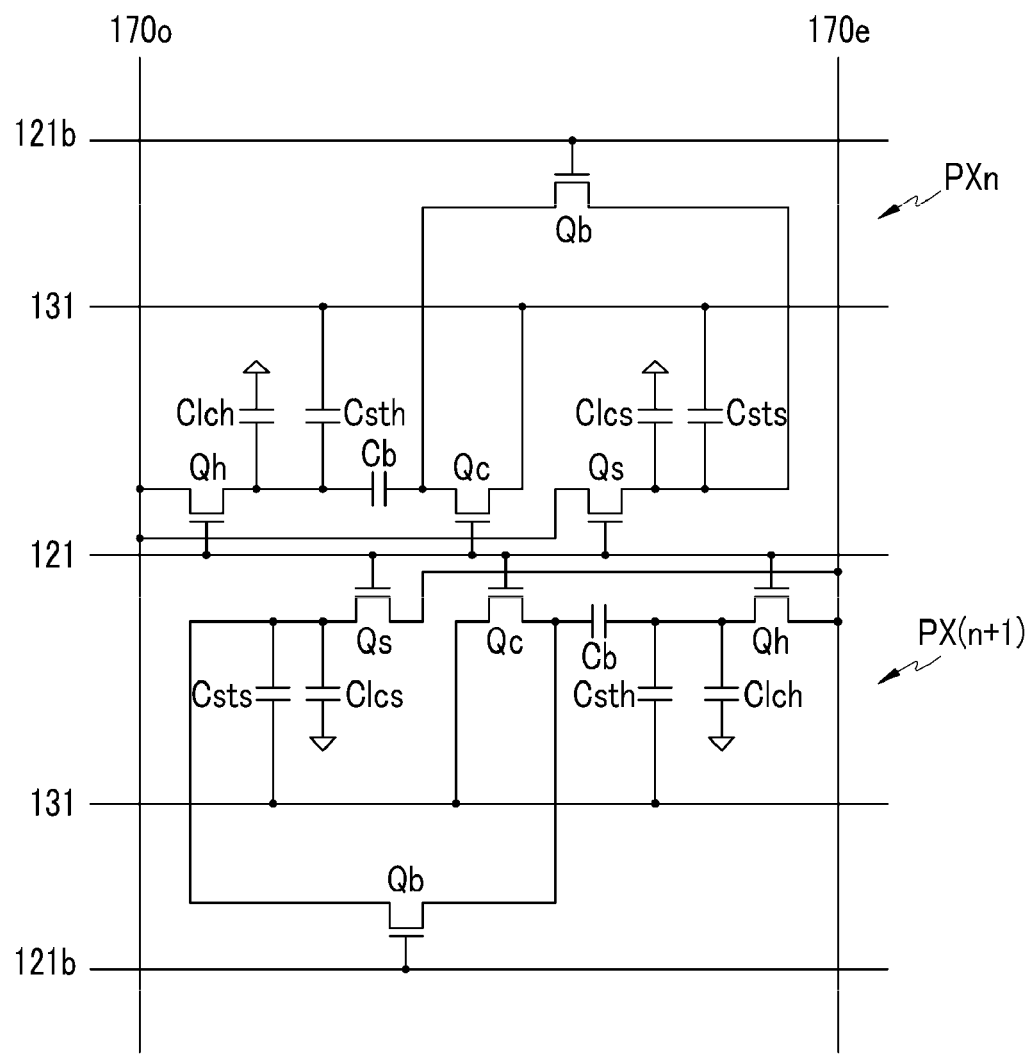
FIG. 18 is an equivalent circuit diagram of two subpixels in a liquid crystal display according to an exemplary embodiment of the present invention.

FIG. 18 is an equivalent circuit diagram of two subpixels in a liquid crystal display according to an exemplary embodiment of the present invention.

The liquid crystal display according to the present exemplary embodiment is similar to that of the liquid crystal display shown in FIG. 2. However, two pixels PXn and PX(n+1) that are neighboring in the column direction share the gate line 121, and the first, second, and third switching elements Qh, Qs, and Qc of the two pixels PXn and PX(n+1) are applied with the same gate signal. On the other hand, the first, second, and third switching elements Qh, Qs, and Qc of the two pixels PXn and PX(n+1) are connected to the different data lines 171o and 171e, and thereby the data voltages corresponding to the two pixels PXn and PX(n+1) are applied thereto.

Next, the detailed structure of the liquid crystal display shown in FIG. 18 will be described with reference to FIG. 19 and FIG. 20.

Figure 19:
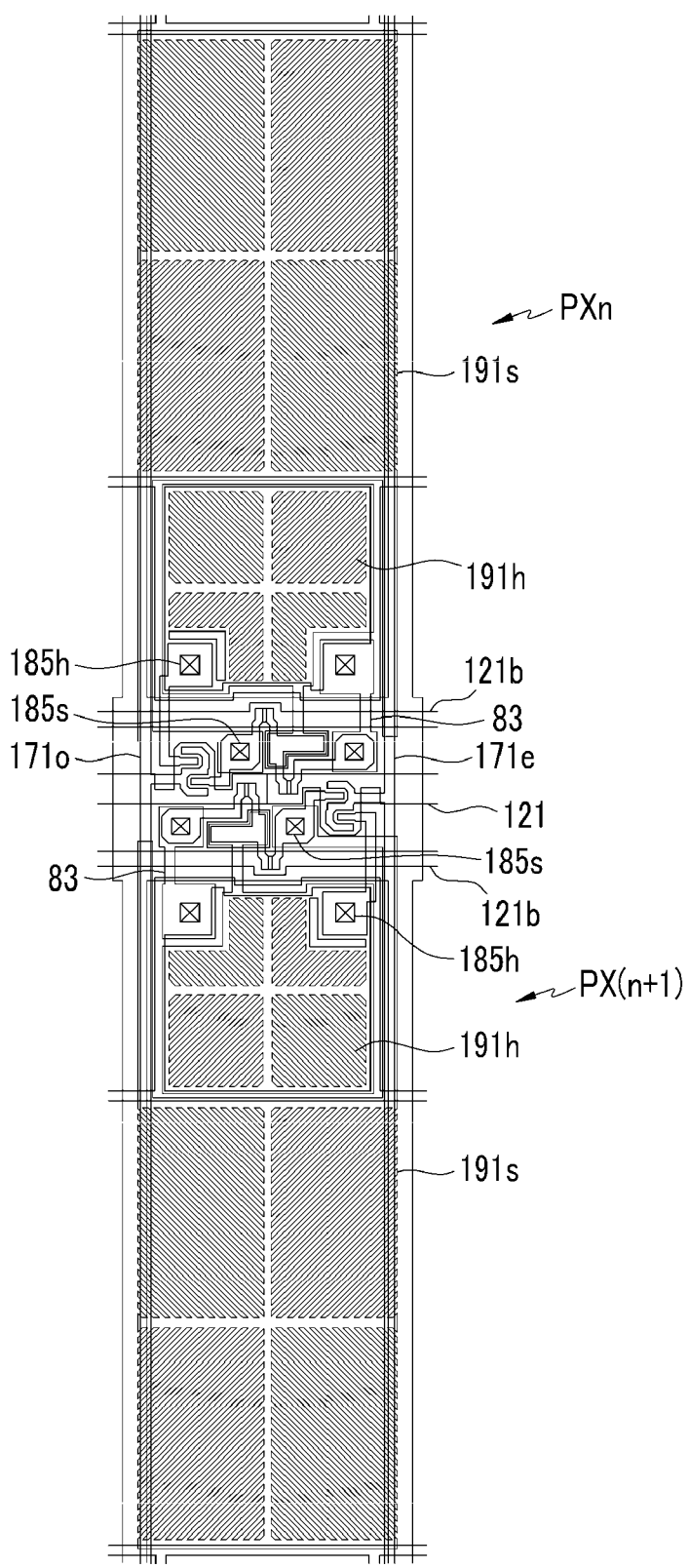
FIG. 19 is a layout view of a liquid crystal display according to an exemplary embodiment of the present invention.
Figure 20:
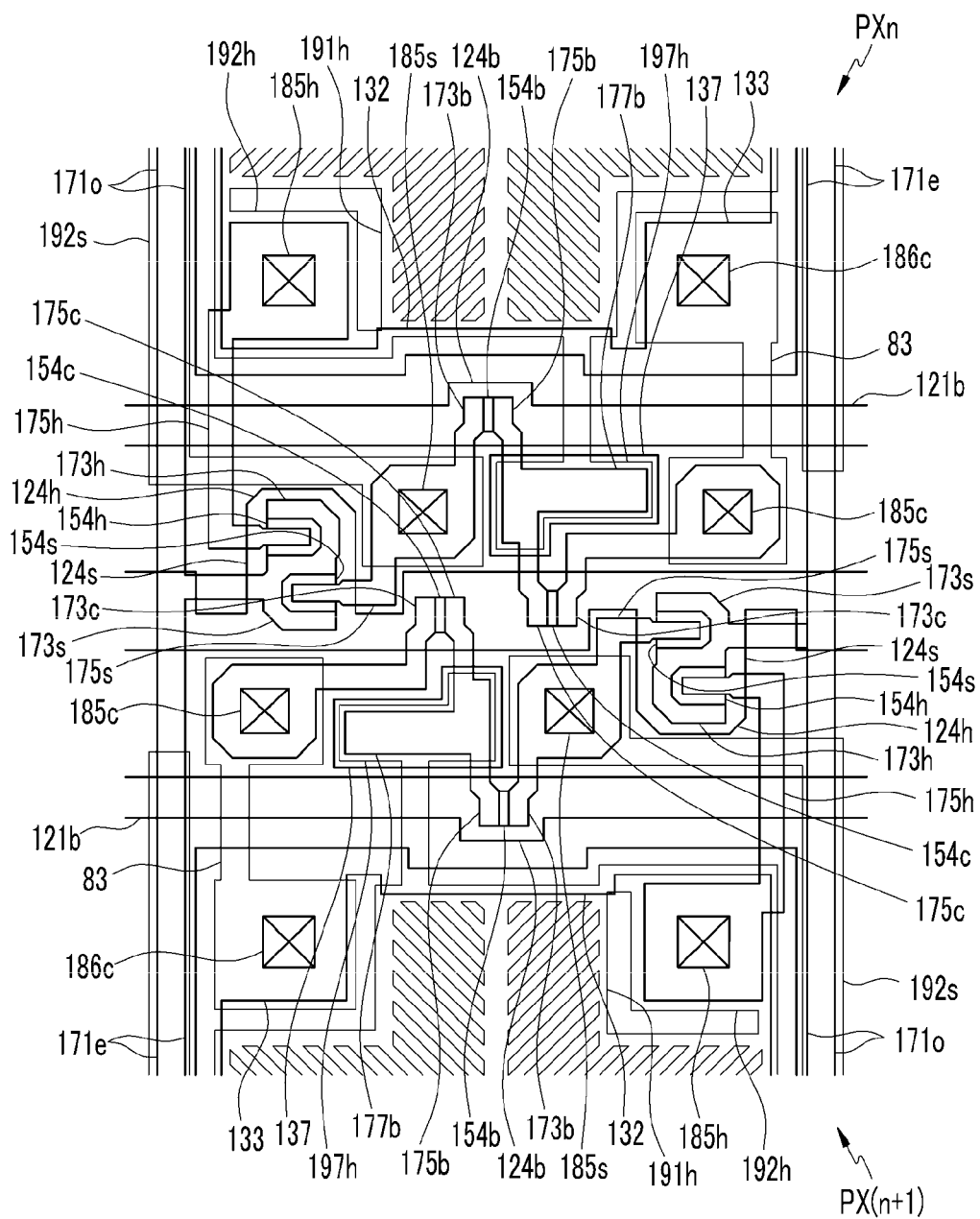
FIG. 20 is an enlarged layout view of the portion shown in FIG. 19.

FIG. 19 is a layout view of a liquid crystal display according to an exemplary embodiment of the present invention, and FIG. 20 is an enlarged layout view of the portion shown in FIG. 19.

The layered structure of a liquid crystal displays according to the present exemplary embodiment has many of the same elements as does that of the embodiment of a liquid crystal display shown in FIG. 16 and FIG. 17. The same constituent elements of the exemplary embodiment of FIG. 16 and FIG. 17 are indicated by the same reference numerals. Accordingly, the same description of the same elements is omitted.

Referring to FIG. 19 and FIG. 20, two pixels PXn and PX(n+1) that are neighboring in the column direction are point symmetrical, and share the gate line 121. When the two pixels PXn and PX(n+1) that are neighboring in the column direction are point symmetrical, the differences of the openings according to the viewing angle may be eliminated. Particularly, all thin film transistors Qh, Qs, Qc, and Qb and the boosting capacitor Cb are disposed between the neighboring pixels PXn and PX(n+1), and the two pixels PXn and PX(n+1) share the gate line 121 such that the aperture ratio and transmittance of the liquid crystal display may be increased. Although not shown, the pixels PX that are neighboring in the row direction may be symmetrical with respect to the Y-axis.

The structures of the pixels PXn and PX(n+1) are similar to the respective pixels PXn and PX(n+1) of the embodiment of the liquid crystal display of FIG. 16 and FIG. 17. However, the first and second thin film transistors Qh and Qs, particularly the shapes of the first and second source electrode 173h and 173s and the first and second drain electrodes 175h and 175s, are different.

In the embodiment illustrated in FIG. 19 and FIG. 20, the first and second source electrodes 173h and 173s are connected in the up-and-down direction, and the opened portions of the first and second source electrodes 173h and 173s face opposite directions to each other toward the right or left side. Accordingly, if the opened portions of the first and second source electrodes 173h and 173s are opposite to each other as illustrated, when the gate-on voltage Von of the gate line 121 is changed to the gate-off voltage Voff, deterioration of display characteristics due to the deviation of the kick-back voltages generated by the parasitic capacitance formed between the gate electrodes 124h and 124s of the first and second thin film transistors Qh and Qs, and the drain electrodes 175h and 175s, may be reduced.

This will now be described with reference to FIG. 21, FIG. 22, and FIG. 23.

Figure 21:
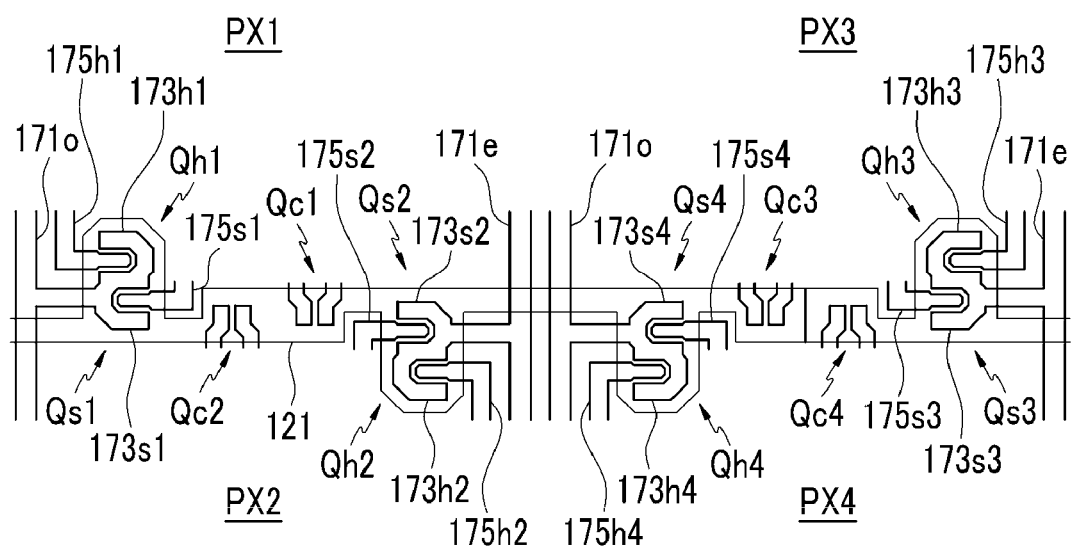
FIG. 21 is a layout view of thin film transistors of four pixels neighboring in row and column directions in a liquid crystal display according to an exemplary embodiment of the present invention.

FIG. 21 is a layout view of thin film transistors of four pixels PX1, PX2, PX3, and PX4 neighboring in row and column directions in a liquid crystal display according to an exemplary embodiment of the present invention. FIG. 22 is a view showing an arrangement of a signal line, a thin film transistor, and a pixel electrode, and a change of a kick-back voltage in a liquid crystal display according to an exemplary embodiment of the present invention, and FIG. 23 is a view showing various shapes of thin film transistors according to an exemplary embodiment of the present invention.

Figure 22:
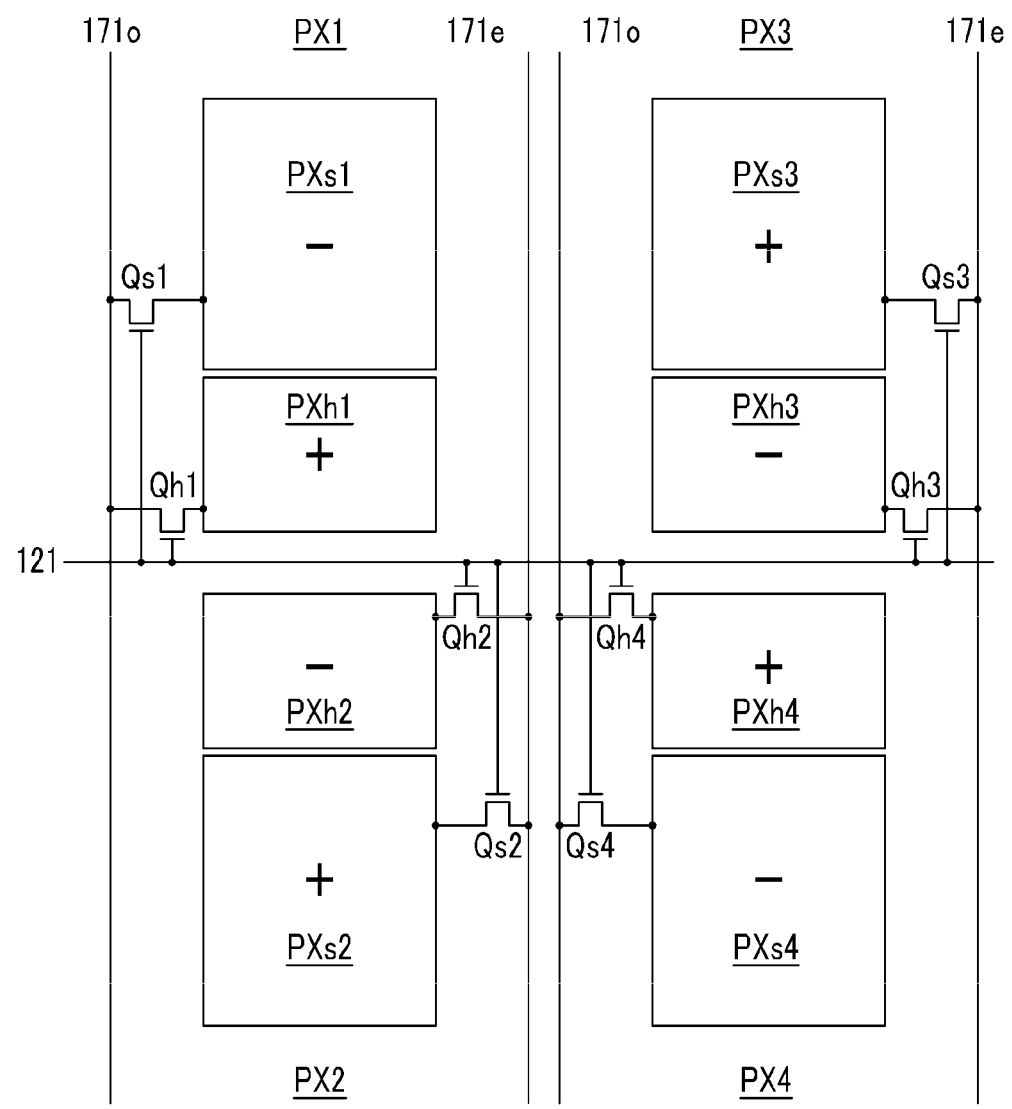
FIG. 22 is a view showing an arrangement of a signal line, a thin film transistor, and a pixel electrode, and a change of a kick-back voltage in a liquid crystal display according to an exemplary embodiment of the present invention.

Referring to FIG. 21 and FIG. 22, the pixel PX1 is connected to the first and second thin film transistors Qh1 and Qs1, the pixel PX2 is connected to the first and second thin film transistors Qh2 and Qs2, the pixel PX3 is connected to the first and second thin film transistors Qh3 and Qs3, and the pixel PX4 is connected to the first and second thin film transistors Qh4 and Qs4.

The pixels PX1 and PX2 that are neighboring in the column direction form a point symmetry such that the opened direction of the first source electrodes 173h1 and 173h2 of the respective first thin film transistors Qh1 and Qh2 are opposite to each other, and the opened direction of the second source electrodes 173s1 and 173s2 of the respective second thin film transistors Qs1 and Qs2 are also opposite to each other. The pixels PX3 and PX4 that are neighboring in the column direction form a point symmetry such that the opened direction of the first source electrodes 173h3 and 173h4 of the respective first thin film transistors Qh3 and Qh4 are opposite to each other, and the opened direction of the second source electrodes 173s3 and 173s4 of the respective second thin film transistors Qs3 and Qs4 are also opposite to each other.

The pixels PX1 and PX3 that are neighboring in the row direction form the Y-axis symmetry such that the opened direction of the first source electrodes 173h1 and 173h3 of the respective first thin film transistor Qh1 and Qh3 are opposite to each other, and the opened direction of the second source electrodes 173s1 and 173s3 of the respective second thin film transistors Qs1 and Qs3 are also opposite to each other. The pixels PX2 and PX4 that are neighboring in the row direction form the Y-axis symmetry such that the opened direction of the first source electrodes 173h2 and 173h4 of the respective first thin film transistor Qh2 and Qh4 are opposite to each other, and the opened direction of the second source electrodes 173s2 and 173s4 of the respective second thin film transistors Qs2 and Qs4 are also opposite to each other.

Through this arrangement, when errors of right and left alignment between the gate line 121 and the drain electrodes 175h1, 175s1, 175h2, 175s2, 175h3, 175s3, 175h4, 175s4 are present, the kick-back voltages may be compensated by each other.

FIG. 22 is a view showing the increasing and decreasing of the kick-back voltages of the pixels PX1, PX2, PX3, and PX4, when the gate line 121 of FIG. 21 is misaligned relative to the left side.

If the gate line 121 is misaligned to the left side with respect to the drain electrodes 175h1, 175s1, 175h2, 175s2, 175h3, 175s3, 175h4, 175s4, the kick-back voltages of the first subpixel PXh1 connected to the first thin film transistor Qh1 of the pixel PX1, the second subpixel PXs2 connected to the second thin film transistor Qs2 of the pixel PX2, the second subpixel PXs3 connected to the second thin film transistor Qs3 of the pixel PX3, and the first subpixel PXh4 connected to the first thin film transistor Qh4 of the pixel PX4 are increased. However, the kick-back voltages of the remaining first subpixels PXh2 and PXh3 and second subpixels PXs1 and PXs4 are decreased. When the gate line 121 is misaligned to the right side, the situation is reversed. Accordingly, as shown in FIG. 22, the increasing and decreasing of the kick-back voltages is represented as a mosaic shape, and are compensated by each other such that a display deterioration such as a transverse line is not generated, even if errors of right and left alignment between the gate line 121 and the drain electrodes 175h1, 175s1, 175h2, 175s2, 175h3, 175s3, 175h4, 175s4 are present.

Figure 23:
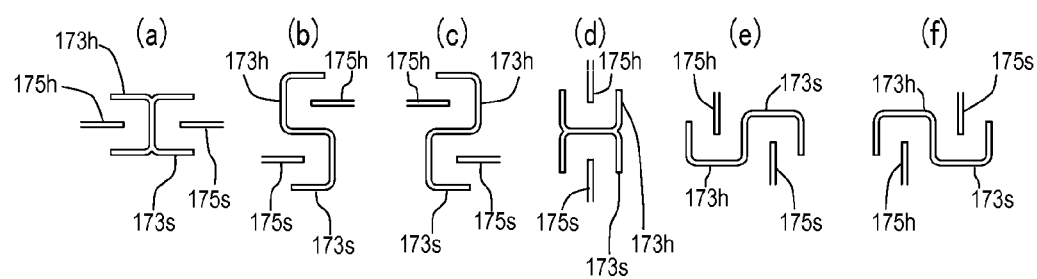
FIG. 23 (a), FIG. 23 (b), FIG. 23 (c), FIG. 23 (d), FIG. 23 (e) and FIG. 23 (f), are views showing various shapes of a thin film transistor according to an exemplary embodiment of the present invention.

The shape of a pair of source electrodes 173h1, 173s1, 173h2, 173s2, 173h3, 173s3, 173h4, and 173s4, and a pair of drain electrodes 175h1, 175s1, 175h2, 175s2, 175h3, 175s3, 175h4, 175s4 for each respective pixel PX1, PX2, PX3, and PX4 is not limited to the present exemplary embodiment, but may have various shapes as shown in FIG. 23 (a), FIG. 23 (b), FIG. 23 (c), FIG. 23 (d), FIG. 23 (e), and FIG. 23 (f). As shown in the illustrated embodiments, a pair of source electrodes 173h and 173s and a pair of drain electrodes 175h and 175s can have various shapes and orientations.

According to an exemplary embodiment of the present invention, the boosting capacitor is used to generate a difference in the charging voltage of the first subpixel and the second subpixel such that the display characteristics such as the side visibility may be improved, and the transmittance of the liquid crystal display may be improved.

Also, according to an exemplary embodiment of the present invention, the pixels that are neighboring in the column direction share the same gate line such that a driving margin may be obtained under a high speed driving of a liquid crystal display, and the aperture ratio according to viewing angle may be improved.

Also, the directions of the thin film transistors of each subpixel are opposite to each other such that display deterioration due to kick-back voltage deviation may be reduced.

When the word "about" is used in this specification in connection with a numerical value, it is intended that the associated numerical value include a tolerance of ±10% around the stated numerical value. The terms and phases used herein are not to be interpreted with mathematical or geometric precision, rather geometric terminology is to be interpreted as meaning approximating or similar to the geometric terms and concepts. Terms such as "generally" and "substantially" are intended to encompass both precise meanings of the associated terms and concepts as well as to provide reasonable latitude which is consistent with form, function, and/or meaning.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their.

What is claimed is:

1. A liquid crystal display, comprising:
   a first substrate;
   a gate line disposed on the first substrate to transmit a first gate signal;
   a data line disposed on the first substrate and crossing the gate line to transmit a data voltage;
   a boosting gate line disposed on the first substrate to transmit a second gate signal;
   a pixel electrode disposed on the first substrate and comprising a first subpixel electrode and a second subpixel electrode;
   a first switching element comprising a first gate electrode connected to the gate line, a first source electrode connected to the data line, and a first drain electrode connected to the first subpixel electrode;
   a second switching element comprising a second gate electrode connected to the gate line, a second source electrode connected to the data line, and a second drain electrode connected to the second subpixel electrode;
   a boosting capacitor comprising a first terminal connected to the first subpixel electrode;
   a third switching element comprising a third gate electrode connected to the gate line, a third source electrode, and a third drain electrode connected to a second terminal of the boosting capacitor; and
   a fourth switching element comprising a fourth gate electrode connected to the boosting gate line, a fourth source electrode connected to the second subpixel electrode, and a fourth drain electrode connected to the second terminal of the boosting capacitor,
wherein the boosting gate line is not directly connected to any switching element which is connected to the data line.

2. The liquid crystal display of claim 1, wherein,
the first switching element, the second switching element, and the third switching element are configured to be on when the fourth switching element is off, and the fourth switching element is configured to be on when the first switching element, the second switching element, and the third switching element are off.

3. The liquid crystal display of claim 2, wherein,
when the fourth switching element is on, a voltage of the first subpixel electrode and a voltage of the second subpixel electrode are changed.

4. The liquid crystal display of claim 1, further comprising
a common voltage line disposed on the first substrate,
wherein the third source electrode is connected to the common voltage line to receive a common voltage from the common voltage line.

5. The liquid crystal display of claim 4, wherein
the common voltage line is disposed in the same layer as at least one of the gate line and the boosting gate line.

6. The liquid crystal display of claim 5, wherein
the third source electrode is connected to the common voltage line through an overpass.

7. The liquid crystal display of claim 6, wherein
the overpass is disposed in the same layer as the first subpixel electrode and the second subpixel electrode.

8. The liquid crystal display of claim 7, wherein
a first contact portion where the first subpixel electrode and the first drain electrode are connected to each other is symmetrical to a second contact portion where the third source electrode and the overpass are connected to each other with respect to the first subpixel electrode.

9. The liquid crystal display of claim 4, wherein
the common voltage line comprises a stem parallel to the gate line, and a longitudinal portion protruding from the stem.

10. The liquid crystal display of claim 9, wherein
at least a portion of the longitudinal portion overlaps a periphery of the first subpixel electrode.

11. The liquid crystal display of claim 9, wherein
a portion of the first subpixel electrode overlaps the boosting gate line.

12. The liquid crystal display of claim 9, wherein
the common voltage line further comprises a transverse portion overlapping a periphery of the first subpixel electrode.

13. The liquid crystal display of claim 1, further comprising
a color filter disposed on the first substrate.

14. The liquid crystal display of claim 13, further comprising
a light blocking member disposed at the position of at least one of on the first subpixel electrode, under the first subpixel electrode, on the second subpixel electrode, and under the second subpixel electrode.

15. The liquid crystal display of claim 13, further comprising
a second substrate facing the first substrate, and a light blocking member disposed on the second substrate.

16. The liquid crystal display of claim 13, further comprising
a passivation layer disposed on the color filter.

17. The liquid crystal display of claim 16, wherein
a portion of the passivation layer where the boosting capacitor is disposed is removed.

18. The liquid crystal display of claim 1, wherein
at least one of the gate line, the boosting gate line, the first switching element, the second switching element, the third switching element, the fourth switching element, and the boosting capacitor is disposed between the first subpixel electrode and the second subpixel electrode.

19. A liquid crystal display, comprising:
a gate line to transmit a first gate signal;
a boosting gate line to transmit a second gate signal;
a first data line to transmit a first data voltage and a second data line to transmit a second data voltage; and
a first pixel and a second pixel that are disposed between the first data line and the second data line, the first pixel and the second pixel neighboring each other,
wherein each of the first pixel and the second pixel comprises:
a first subpixel comprising a first liquid crystal capacitor and a first switching element;
a second subpixel comprising a second liquid crystal capacitor and a second switching element; and
a first boosting unit comprising a third switching element controlled by the first gate signal, a fourth switching element connected to the third switching element and controlled by the second gate signal, and a first boosting capacitor connected between the third switching element and the first liquid crystal capacitor,
wherein the first switching element of the first pixel is operable to transmit the first data voltage to the first liquid crystal capacitor of the first pixel in response to the first gate signal, and the second switching element of the first pixel is operable to transmit the first data voltage to the second liquid crystal capacitor of the first pixel in response to the first gate signal, and
the first switching element of the second pixel is operable to transmit the second data voltage to the first liquid crystal capacitor of the second pixel in response to the first gate signal, and the second switching element of the second pixel is operable to transmit the second data voltage to the second liquid crystal capacitor of the second pixel in response to the first gate signal.

20. The liquid crystal display of claim 19, wherein
the boosting gate line comprises a first boosting gate line connected to the fourth switching element of the first pixel, and a second boosting gate line connected to the fourth switching element of the second pixel.

21. The liquid crystal display of claim 20, wherein
the first pixel and the second pixel are symmetrical to each other with respect to the gate line.

22. The liquid crystal display of claim 21, wherein
the first liquid crystal capacitor comprises a first subpixel electrode connected to the first switching element, and the second liquid crystal capacitor comprises a second subpixel electrode connected to the second switching element.

23. The liquid crystal display of claim 22, wherein
at least one of the gate line, the boosting gate line, the first switching element, the second switching element, the third switching element, the fourth switching element, and the boosting capacitor is disposed between the first subpixel electrode of the first pixel and the first subpixel electrode of the second pixel.

24. The liquid crystal display of claim 19, further comprising:
- a third data line to transmit a third data voltage and a fourth data line to transmit a fourth data voltage; and
- a third pixel and a fourth pixel that are disposed between the third data line and the fourth data line, the third pixel and the fourth pixel neighboring each other,
- wherein each of the third pixel and the fourth pixel comprises:
- a third subpixel comprising a third liquid crystal capacitor and a fifth switching element;
- a fourth subpixel comprising a fourth liquid crystal capacitor and a sixth switching element; and
- a second boosting unit comprising a seventh switching element controlled by the first gate signal, an eighth switching element connected to the seventh switching element and controlled by the second gate signal, and a second boosting capacitor connected between the seventh switching element and the third liquid crystal capacitor,
- wherein the fifth switching element of the third pixel transmits the third data voltage to the third liquid crystal capacitor of the third pixel in response to the first gate signal, and the sixth switching element of the third pixel transmits the third data voltage to the fourth liquid crystal capacitor of the third pixel in response to the first gate signal, and
- the fifth switching element of the fourth pixel transmits the fourth data voltage to the third liquid crystal capacitor of the fourth pixel in response to the first gate signal, and the sixth switching element of the fourth pixel transmits the fourth data voltage to the fourth liquid crystal capacitor of the fourth pixel in response to the first gate signal.

25. The liquid crystal display of claim 24, wherein:
- the first switching element comprises a first source electrode, the second switching element comprises a second source electrode, the fifth switching element comprises a third source electrode, and the sixth switching element comprises a fourth source electrode;
- each of the first source electrode, the second source electrode, the third source electrode, and the fourth source electrode comprises an opening;
- a direction of the opening of the first source electrode and a direction of the opening of the second source electrode are opposite to each other in each of the first pixel and the second pixel; and
- a direction of the opening of the third source electrode and a direction of the opening of the fourth source electrode are opposite to each other in each of the third pixel and the fourth pixel.

26. The liquid crystal display of claim 25, wherein:
- the direction of the opening of the first source electrode in the first pixel is opposite to the direction of the opening of the first source electrode in the second pixel; and
- the direction of the opening of the third source electrode in the third pixel is opposite to the direction of the opening of the third source electrode in the fourth pixel.

27. The liquid crystal display of claim 26, wherein:
- the direction of the opening of the first source electrode in the first pixel is opposite to the direction of the opening of the third source electrode in the third pixel; and
- the direction of the opening of the first source electrode in the second pixel is opposite to the direction of the opening of the third source electrode in the fourth pixel.

* * * * *